United States Patent [19]

Sagawa et al.

[11] Patent Number: 5,699,271
[45] Date of Patent: Dec. 16, 1997

[54] METHOD OF AUTOMATICALLY GENERATING PROGRAM FOR SOLVING SIMULTANEOUS PARTIAL DIFFERENTIAL EQUATIONS BY USE OF FINITE ELEMENT METHOD

[75] Inventors: Nobutoshi Sagawa, Kokubunji; Chisato Konno, Inagi; Yukio Umetani, Hachioji, all of Japan

[73] Assignee: Hitachi, Ltd., Tokyo, Japan

[21] Appl. No.: 577,092

[22] Filed: Aug. 31, 1990

Related U.S. Application Data

[63] Continuation of Ser. No. 237,701, Aug. 29, 1988, abandoned.

[30] Foreign Application Priority Data

Aug. 28, 1987 [JP] Japan .................................. 62-212759
Jun. 8, 1988 [JP] Japan .................................. 63-139275

[51] Int. Cl.⁶ .................................. G06F 17/00
[52] U.S. Cl. .................................. 364/578
[58] Field of Search .................................. 364/578, 300, 364/702, 704, 973; 395/705, 706, 707, 708, 709, 702

[56] References Cited

U.S. PATENT DOCUMENTS

| | | | |
|---|---|---|---|
| 4,742,473 | 5/1988 | Shugar et al. | 364/578 |
| 4,797,842 | 1/1989 | Nackman et al. | 364/578 |
| 4,809,202 | 2/1989 | Wolfram | 364/578 |
| 4,819,161 | 4/1989 | Kon'no et al. | 364/300 |
| 4,858,146 | 8/1989 | Shebini | 364/578 X |

OTHER PUBLICATIONS

Pratt J "Programming Languages" Prentice–Hall Inc (Eaglewoods Cliffs, NJ) 1984.
"A High Level Programming Language For Numerical Simulation & DEQSOL" Kon'no et al. IEEE Tokyo Denshi Tokyo No. 25 (1986) pp. 50–53.
"Advanced Implicit Solation Function Of DEQSOL And Its Evaluation" Kon'no et al. Proceedings of the Fall Joint Computer Conference Nov. 2–6, 1986 Dal. TX pp. 1026–1033.
MACSYMA, Product Description, Computer–Aided Mathematics Group Symbolics, Inc. IEEE Spectrum Jul. 1987 p. 51.
PHOENICS, Product Description, CHAM 5 pages.

*Primary Examiner*—Ellis B. Ramirez
*Attorney, Agent, or Firm*—Antonelli, Terry, Stout, & Kraus, LLP

[57] ABSTRACT

A program generating method for generating a FORTRAN program by use of a computer having the following steps of automatically selecting an optimal weight function for each equation of the system of partial differential equations including coupled plural variables and partial differential equations to effect a multiplication therebetween, performing a partial integration thereon, automatically selecting from a group of boundary conditions an optimal boundary condition for each partial differential equation to conduct a collation processing of the boundary condition, exchanging the order of the summation and the integration on the object variable to effect a discretize processing of the variable, assigning components to a coefficient matrix and a constant vector, and generating a FORTRAN program to solve the equations through a linear computation.

29 Claims, 25 Drawing Sheets

FIG. 7

| | TERM NOT ASSOCIATED WITH NORMAL VECTOR INCLUDES OBJECT VARIABLE | 2ND KIND BOUNDARY CONDITION |
|---|---|---|
| TERM ASSOCIATED WITH NORMAL VECTOR INCLUDES OBJECT VARIABLE | TERM NOT ASSOCIATED WITH NORMAL VECTOR INCLUDES OBJECT VARIABLE | 2ND KIND BOUNDARY CONDITION |
| TERM ASSOCIATED WITH NORMAL VECTOR INCLUDES OBJECT VARIABLE | TERM NOT ASSOCIATED WITH NORMAL VECTOR DOES NOT INCLUDE OBJECT VARIABLE | 1ST KIND BOUNDARY CONDITION |
| TERM ASSOCIATED WITH NORMAL VECTOR DOES NOT INCLUDE OBJECT VARIABLE | TERM NOT ASSOCIATED WITH NORMAL VECTOR DOES NOT INCLUDE OBJECT VARIABLE | 2ND KIND BOUNDARY CONDITION |

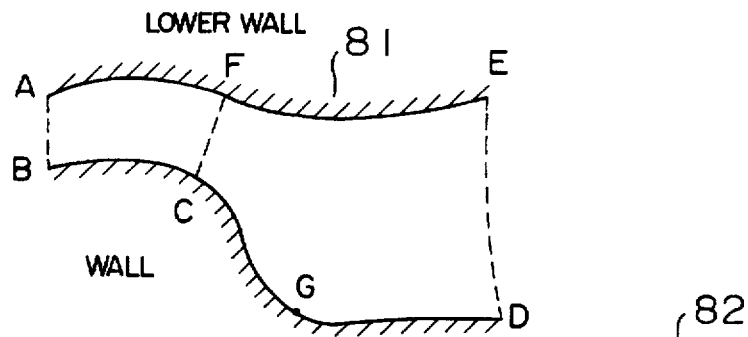

LOWER WALL
A, F, E (81)
B, C
WALL
G, D

| | | |
|---|---|---|
| REGION INFORMATION | $A = (0.30), B = (0.25), C = \cdots$ ~85<br>$AB = LINE(A.B),$ ~86<br>$BD = CURVE(B.C.G.D)$ ~87<br>$DE = \cdots$<br>$ABCF = QUAD(A.B.C.F),$ ~88<br>$CDEF = QUAD(C.D.E.F),$ ~89 | 82 |
| GROUP OF BOUNDARY | $u = 0, v = 0$    at $BD + AE$. ~810<br>$u = \bar{u}, v = \bar{v}, lh(IV) = r$ at $AB$. ~811<br>$p = 0, lh(grad\ u) = 0\ \ lh(grad\ v) = 0$<br>at $DE$ ~812 | 83 |
| SYSTEM OF PARTIAL DIFFERENTIAL EQUATIONS | SOLVE $u:2, v:2, p:1$ OF ~813<br>$-dx(p) + \mu * diu(grad\ u) = 0$ ~814<br>$-dy(p) + \mu * diu(grad\ v) = 0$ ~815<br>$diu(N) = 0$ ~816 | 84 |

$*IV = (u,v)$
$lh$ : NORMAL VECTOR

| 1001 | HEADER OF BINARY | 1006 | HEADER OF BINARY |
| 1004 | TREE OF PARTIAL | 1007 | TREE OF BOUNDARY |
| 1005 | DIFFERENTIAL EQUATIONS | 1008 | CONDITIONS |

EQUATION INFORMATION E

EQUATION INFORMATION E

EQUATION INFORMATION A

EQUATION INFORMATION D

2501

2601

F I G. 30
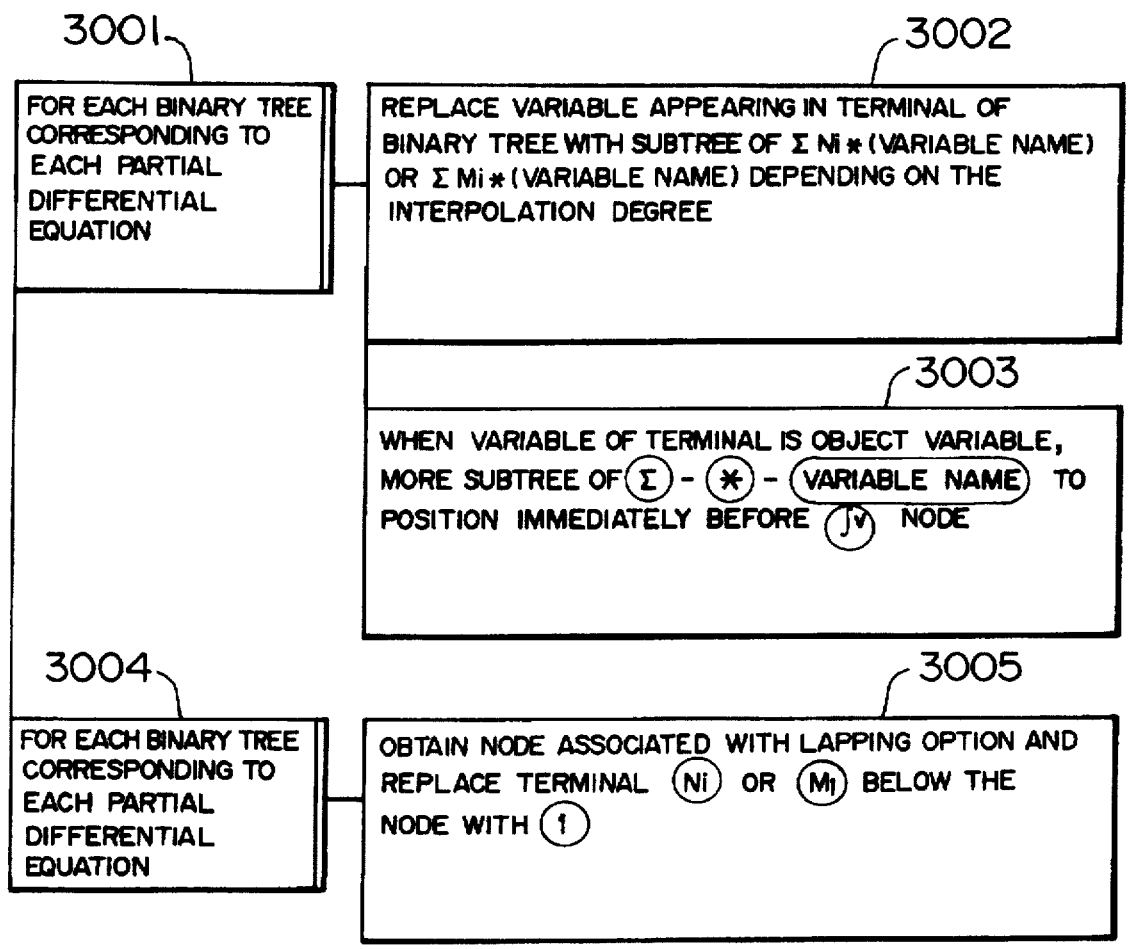

FIG. 32

```
N = 1                           ~3202
M = 3                           ~3203
DO 10    L = 1, MESHNO          ~3204
DO 10    I = 1, NODES(L)        ~3205
DO 10    J = 1, NODE (L)        ~3206
  LI = IADATA (L,I)             ~3207
  LJ = IADATA (L,J)             ~3208
  IF(INTER(LI).NE.0) THEN       ~3209
  IF(INTER(LJ).NE.0) THEN       ~3210
    CALL IFUNC(L,SFNX,SFM,VAL)  ~3211
  END IF
  END IF
    COEF(3*(LI-1)+M, 3*(LJ-1)+N)     ~3212
  = COEF (3*(LI-1)+M, 3*(LJ-1)+N)+VAL
10 CONTINUE
```

METHOD OF AUTOMATICALLY GENERATING PROGRAM FOR SOLVING SIMULTANEOUS PARTIAL DIFFERENTIAL EQUATIONS BY USE OF FINITE ELEMENT METHOD

This application is a continuation of application Ser. No. 237,701, filed Aug. 29, 1988, now abandoned.

CROSS-REFERENCE TO RELATED APPLICATIONS

The present application relates to <Konno et al U.S. application Ser. No. 900,424 filed Aug. 26, 1986 entitled "Method of Automatic Generation of a Computer Program for Numerical Simulation of Physical Phenomenon which issued as U.S. Pat. No. 4,819,161" and U.S. application Serial No. 245,201, entitled "Method and Device for Displaying Information on Simulation Result in a Numerical Simulation System" filed Aug. 29, 1988 by Mizuki Saji, Chisato Konno and Yukio Umetani and assigned to the present assignee, based on Japanese Patent Application No. 62-212758 filed Aug. 28, 1987.

BACKGROUND OF THE INVENTION

The present invention relates to a method of automatically generating a numeric simulation program of a problem in a field of physics represented by a simultaneous system of partial differential equations having a plurality of variables therein and a group of boundary conditions based on the given partial differential equations and boundary conditions, and in particular, to a program generation method suitable for generating numeric simulation programs to achieve a fluid analysis and a structure analysis.

An automatic program generation method has already been known in which a partial differential equation and an analysis object domain or region each associated with a physical phenomenon are supplied as inputs thereto such that the physical phenomenon is numerically simulated by use of the lignite element method.

For example, such a method has been described in pages 1026 to 1033 of the Proceedings of Fall Joint Computer Conference (1986) or in pages 50 to 53 of the Densi Tokyo, No. 25 (1986). In addition, an invention related to the method above has also been disclosed in U.S. patent application Ser. No. 900,424 filed on Aug. 26, 1986 which issued as U.S. Pat. No. 4,819,161 and assigned to the assignee of the present invention.

According to the known technology above, the partial differential equation to be handled is limited to a single partial differential equation having only one variable. That is, for example, a program of the finite element method is automatically generated only in a case where a single partial differential equation represented as $$\mathrm{div}(k \cdot \mathrm{grad}(f))=0$$

is to be solved with respect to a variable f.

In addition, the position where the object variable (to be solved) appears in the partial differential equation is also restricted. Namely, in the following equation, $$\mathrm{div}(k \cdot \mathrm{grad}(f_1) + V \cdot f_2)$$

only when the variable to be solved (object variable) is positioned at the location of $f_1$ in the form of this equation, the program is automatically generated.

Furthermore, in a case where an expression of a time-dependent heat transfer problem described in the explicit solution is inputted as follows, $$f=f_0+\mathrm{dlt} \cdot \mathrm{div}(\mathrm{grad}(f_0))$$

a program configuring a general consistent matrix is automatically generated in any case where the values of f and $f_0$ are to be evaluated.

In the prior art, there have not been considered cases when an object system or group of partial differential equations is a simultaneous system of partial differential equations including a plurality of variables and where interpolations are required to be effected with respective different precisions for a plurality of variables. For example, for the following Stokes equation dominating a fluid phenomenon of a fluid having a slow fluid velocity to be solved by use of simultaneous equations (1) to (3).

$$-dx(p)+m \cdot \mathrm{div}(\mathrm{grad}(u))=0 \qquad (1)$$

$$-dx(p)+m \cdot \mathrm{div}(\mathrm{grad}(v))=0 \qquad (2)$$

$$dx(u)+dy(v)=0 \qquad (3)$$

where, m is a viscosity coefficient, dx( ) and dy( ) respectively indicate partial derivatives in the directions of x and y, and u and v are fluid velocities, and p stands for a pressure, it is impossible for the conventional method to automatically generate a program to solve the equations above. In addition, according to the prior art, in a case where a group of boundary conditions are supplied for a simultaneous system of partial differential equations, there has not been considered a method to uniquely determine a correspondence between the partial differential equations and the respective boundary conditions.

Moreover, in the conventional method, the position where the object variable appears in the partial differential equation is limited; consequently, for example, for a fluid discretization equation $$\mathrm{div}(k \cdot \mathrm{grad}(f)+V \cdot f)=0 \qquad (4)$$

a program solving this equation with respect to the variable f cannot be automatically generated.

In addition, according to the prior art, for an expression of a time-dependent heat transfer problem described in the explicit solution $$f=f_0+\mathrm{dlt} \cdot \mathrm{div}(\mathrm{grad}(f_0)) \qquad (5)$$

a program constituting a general consistent matrix is generated when evaluating the values of f and $f_0$, that is, it is impossible to automatically generate a program employing a method (Lamping) in which the consistent matrix is diagonized to save the computation time.

SUMMARY OF THE INVENTION

It is therefore an object of the present invention to provide, in an automatic program generation method in which a system of partial differential equations dominating a physical phenomenon and a group of boundary conditions are inputted so as to automatically generate a numeric simulation program according to the finite element method, a method of automatically generating a program for a simultaneous system of partial differentiation equations in a broader domain or range.

Another object of the present invention is to provide a method of automatically generating a simulation program appropriate to a system of partial differential equations including a plurality of variables requiring interpolations with different precisions and a group of boundary conditions and to provide a method of automatically generating a simulation method appropriate for a partial differential equation including an object variable at an arbitrary position.

Still another object of the present invention is to provide a method of automatically generating a simulation program for which a matrix diagonization has been effected according to a specification in inputted information.

The problems described above of the prior art can be solved by the program generation method according to the present invention in which a system of partial differential equations dominating a physical phenomenon, a group of boundary conditions and specifications related to a shape of a region or domain where the physical phenomenon takes place and to a method of discretization are supplied as input information thereto such that a FORTRAN program is automatically generated to simulate the physical phenomenon on a computer by use of the finite element method, wherein the method includes the following steps of automatically selecting an optimal weight function for each equation of the system of partial differential equations including coupled plural variables and partial differential equations so as to effect a multiplication therebetween, achieving a partial integration thereon, automatically selecting from a group of boundary conditions an optimal boundary condition for each partial differential equation so as to conduct an introduction processing of the boundary condition, exchanging the order of the summation and the integration on the object variable so as to effect a discretize processing of the variable, assigning components to a coefficient matrix and a constant vector, and generating a FORTRAN program to solve the equations through a linear computation.

According to the process by automatically selecting the weight function, there is established a one-to-one correspondence between the degree of the weight function of the partial differential function and the degree of the interpolation of the object variable. This means that the number of unknowns attained as a result of the discretization is equal to the number of equations in the simultaneous system of linear equations, which enables the solutions of the simultaneous linear equations to be attained through a linear computation. In addition, since the weight function is assigned in consideration of the magnitude of attribution of object variables to the respective partial differential equations, there is attained an advantage of the result with respect to the precision.

On the other hand, according to the introduction processing of the boundary conditions, physically natural boundary conditions for the simultaneous partial differential equation can be introduced to the boundary integration terms in an optimal form.

In addition, the discretization processing of the variables is achieved such that all variables and constants appearing in the partial differential equations are developed in a form of $\Sigma N_i f_i$ (where, $N_i$ is a basis function), and then there is effected an expression transformation such that the order of the summation and the intergration are exchanged with respect to the object variable to be solved. As a result, the restriction imposed on the position where the object variable appears in the partial differential equation is removed. Moreover, in a case where the specification is included in the input information, the interpolation function $N_i$ is replaced with 1, which enables only the diagonal component of the coefficient matrix configured by the FORTRAN program to become a diagonal matrix.

BRIEF DESCRIPTION OF THE DRAWINGS

The present invention will be apparent from the following detailed description taken in conjunction with the accompanying drawings in which:

FIG. 7 is a table of rules determining a kind of a boundary condition;

FIG. 8 is a schematic diagram for explaining simulation information;

FIG. 30 is a flowchart of processing of a discretize part;

FIG. 32 is an example of a generated FORTRAN program.

DESCRIPTION OF THE PREFERRED EMBODIMENTS

Prior to description of embodiments according to the present invention, a descretize procedure of partial differential equations will be described in accordance with a finite element method employing the Galerkin's method.

Figure 2:
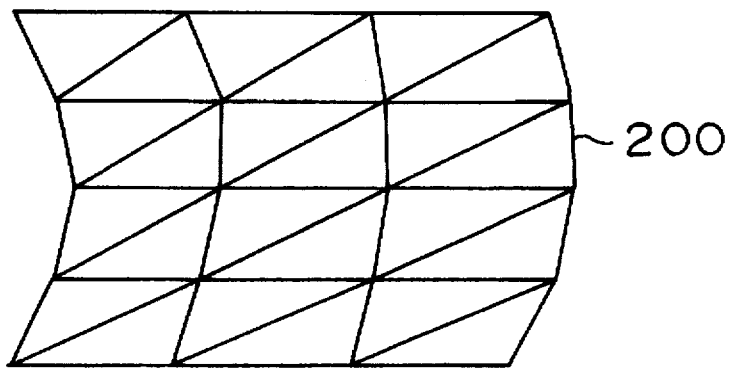
FIG. 2 is a schematic diagram for explaining an element segmentation.
Figure 3:
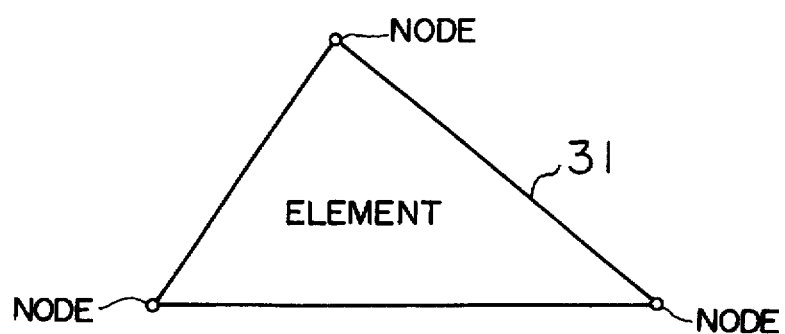
FIGS. 3 and 4 are diagrams useful to explain elements.
Figure 4:
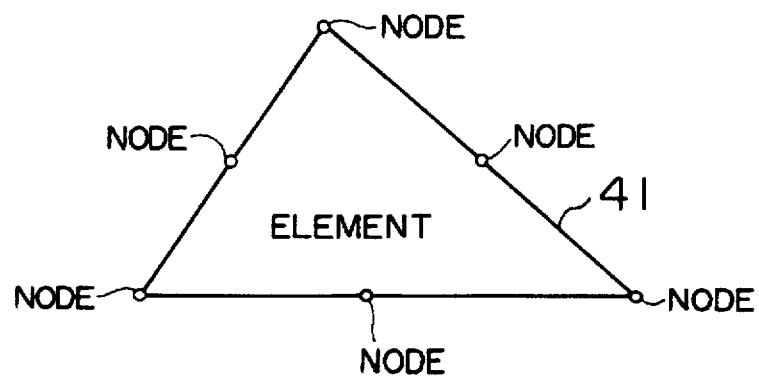

When adopting the finite element method, a domain as an object of the simulation is segmented by use of elements respectively having appropriate sizes. The shape or contour of the elements is in general a triangle or a rectangle (tetrahedron, triangular prism, or parallelepiped in a three-dimensional system). FIG. 2 shows an example of an element segmentation in which each element is provided with a node at a vertex or at an intermediate point thereof, the node being a representative point for which the value of a variable is to be obtained. That is, in a case where the finite element method is used, approximated solutions of partial differential equations are attained in a form of sets of variables for the respective nodes. FIGS. 3 and 4 show relationships between elements and nodes.

In order to determine values of variables on nodes in the finite element method, there is employed a procedure in which the partial differential equations are beforehand transformed into a simultaneous system of linear equations related to the values of variables on the nodes so as to solve the equations through a linear computation. The transform operation of the simultaneous system of linear equations is called a discretization.

Referring now to an example, description will be given of the procedure of the discretization.

In a case where a partial differential equation $$\mathrm{div}(\mathrm{grad}(f))=0 \tag{6}$$

is to be solved with respect to an object variable f, both sides of the expression (6) are multiplied by a weight function $N_j$ such that the integrated result of the overall domain thereof is set to 0. That is, $$\int_v \mathrm{div}(\mathrm{grad}(f))N_j dv=0 \tag{7}$$

Figure 5:
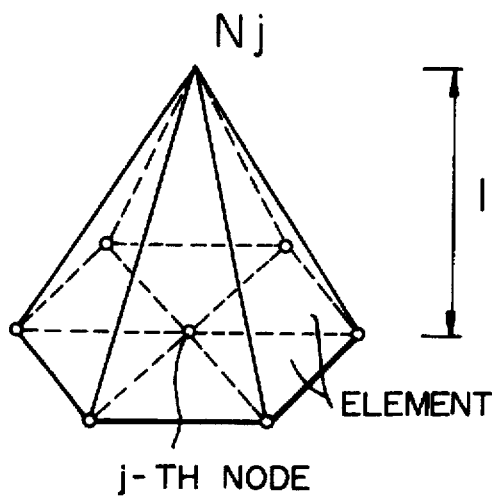
FIG. 5 is an explanatory diagram for explaining a linear weight function.
Figure 6:
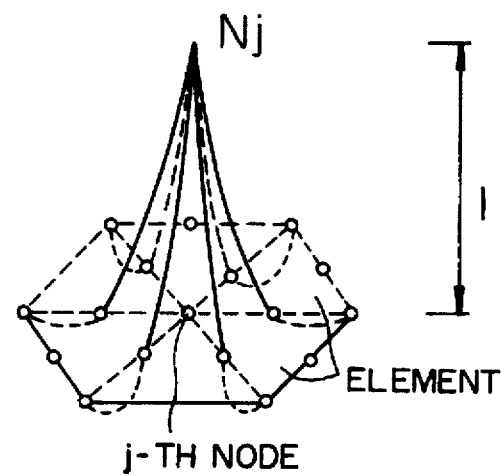
FIG. 6 is a schematic diagram useful to explain a quadratic weight function.

FIGS. 5 and 6 show examples of weight functions in which FIG. 5 is a weight function for the element of FIG. 3 and FIG. 6 is one for the element of FIG. 4. Since one weight function $N_j$ is determined for each node, the expression (7) holds for each node and hence can be considered to form coupled equations of which the number is equal to that of the nodes.

Effecting a partial integration as a mathematical formula on the equation (7), the following equation is attained.

$$\int_v \mathrm{grad}(f)\mathrm{grad}(N_j)dv - \int_s n\mathrm{grad}(f)N_j ds=0 \tag{8}$$

where, n is a unit vector in the normal direction to the boundary.

Since the second term is an integration with respect to the boundary of the object domain, introducing a boundary condition $$n\mathrm{grad}(f)=q \tag{9}$$

where, q is a flux given on the boundary, the equation (8) is transformed into $$\int_v \mathrm{grad}(f)\mathrm{grad}(N_j)dv - \int_s qN_j ds=0 \tag{10}$$

Approximating here the unknown quantity f by use of a linear combination of the known basis function Ni, where fi is a value of f at a node the following is obtained.

$$f=\Sigma N i f i \tag{11}$$

Through the approximation, the continuous quantity f can be replaced with the discrete value fi. That is, the overall distribution of f is approximated by use of the superimposition of the function of FIG. 5 or 6. Assigning the equation (4) to the equation (10).

$$\int_v \mathrm{grad}(\Sigma N i f i)\mathrm{grad}(N_j)dv - \int_s qN_j ds=0 \tag{12}$$

results. Since fi is a constant with respect to the domain, the order of $\int$ and $\Sigma$ is exchanged and fi can be located outside the integration; consequently, the expression can be transformed into $$\Sigma(\int_v \mathrm{grad}(Ni)\mathrm{grad}(N_j)dv)f_i = \int_s qN_j ds \tag{13}$$

In the equation (13), since the respective terms to be integrated are known, the equation (13) forms a simultaneous system of linear equations with respect to fi and is expressed in a matrix form as follows.

$$A\{f\}=\{c\} \tag{14}$$

($a_{ij}$ (component ($i,j$) of matrix $A$)=$\int_v \mathrm{grad}(Ni)\mathrm{grad}(N_j)$ dv$f_j=\int_s qN_j ds$)

Solving the equation (14) through a linear computation, the objective {f} can be obtained. Description has been given of the discretize procedure of a partial differential equation according to the finite element method employing the Galerkin's method.

Next, description will be given of the precision of interpolation for a variable. In a case where the discretization is achieved according to the finite element method, the value of a variable is approximated by use of the equation (11). In other words, the value of a variable at a position other than a node is interpolated by use of the equation (11) based on the value of a variable at a node. In consequence, there appears a difference of the interpolation precision depending on a manner in which the basis function (weight function) N is determined. More specifically, when the element 31 of FIG. 3 is used and hence a basis function of FIG. 5 is employed, the value of a point between nodes is quadratically interpolated by use of the values of the nodes. In this sense, an element like the element 31 of FIG. 3 having the nodes only at the vertices thereof and an element like the element 41 of FIG. 4 possessing the nodes at the vertices thereof and at intermediate points between the nodes are called a linear element and a quadratic element, respectively. Similarly, the weight functions of FIGS. 5 and 6 are respectively called a linear weight function and a quadratic weight function. In general, for the equal number of elements, a higher precision is attained by use of the quadratic element having a higher degree of interpolation as compared with the linear element. Description has been given of the interpolation precision of the variable in the finite element method.

Next, description will be given of means to be adopted for the diagonization of a coefficient matrix. Applying the Galerkin's method to the equation (14), $$\Sigma(\int_v NiN_j dv)f_i= \tag{15}$$

results. Assuming here the interpolation function Ni of the left side to be identically 1, the equation (15) is reduced to $$\Sigma(\int_v Ni dv)f_i= \tag{16}$$

As a result of the transformation, the coefficient matrix obtained from the left side is nonzero only for i=j and is zero for i≠j. In other words, the coefficient matrix has been diagonized. Means for diagonizing the coefficient matrix has been described.

Next, description will be given of an embodiment according to the present invention.

Figure 1:
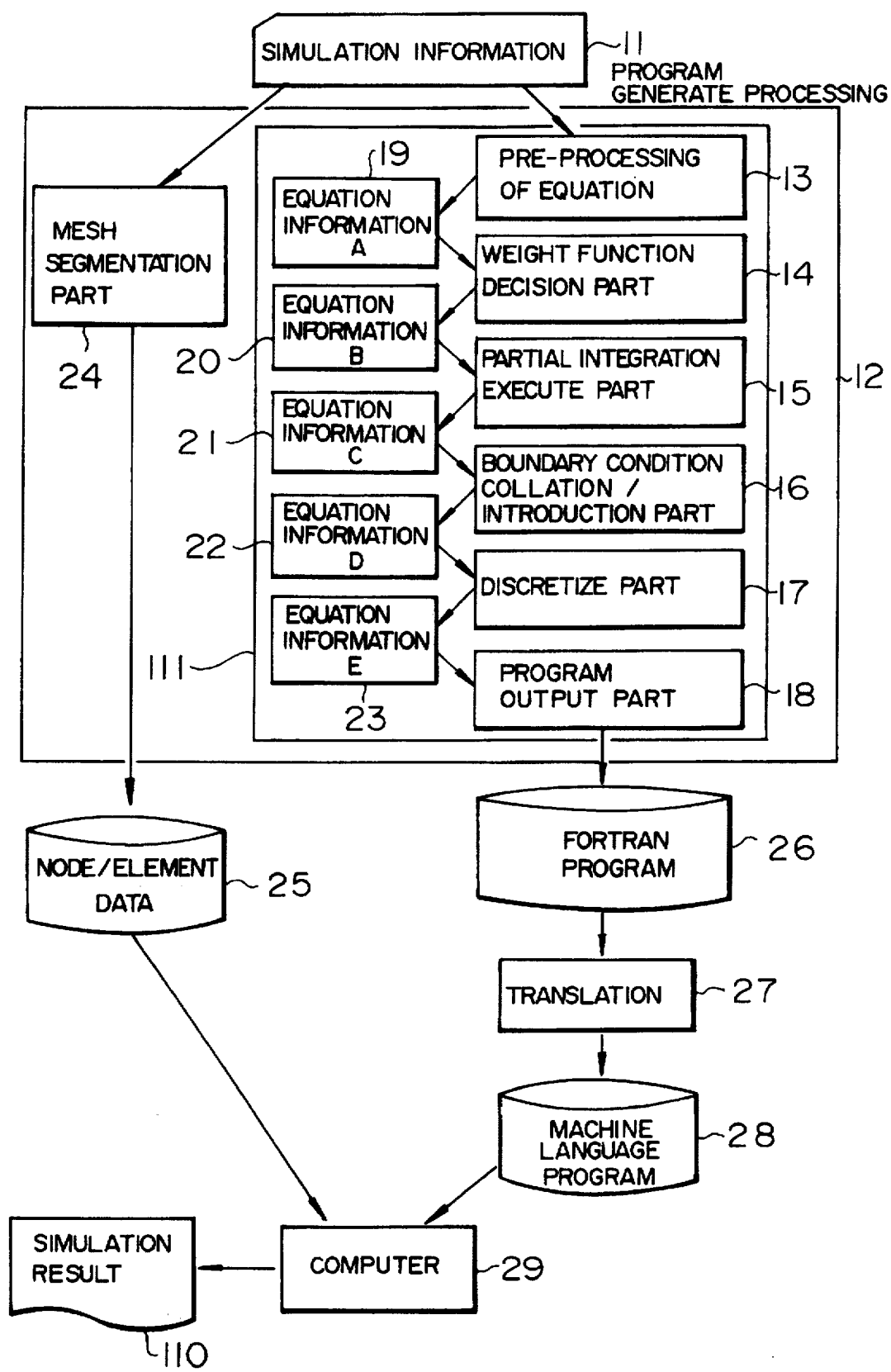
FIG. 1 is an overall configuration diagram of an embodiment according to the present invention.

FIG. 1 shows the configuration of a program generate processing 12 and a flow of data in a case where a numeric simulation is achieved by use of the processing 12.

The program generate processing 12 receives as inputs thereto simulation information 11 containing information items of a group of partial differential equations dominating a physical phenomenon, a group of boundary conditions, a shape of an object domain, and a specification of a method of discretization so as to output a FORTRAN program 26 to simulate the physical phenomenon according to the finite element method. At the same time, node/element data 25 containing information about elements and nodes is outputted. The program 26 thus obtained is converted into a machine language program 28 through a FORTRAN translation mechanism 27. In this situation, if the machine language program 28 is inputted to a computer and the node/element data 25 as data, a simulation result 110 can be attained.

FIG. 8 shows an example of simulation information in a case where a slow fluid velocity of a flow path is to be simulated. Simulation information 11 includes domain information 82, a group of boundary conditions 83, and partial differential equations 84. The domain information 82 includes coordinate information 85 associated with points A, B, C, etc. characterizing the domain, configuration information items 86 and 87 of edges formed by linking the points, and configuration information items 88 and 89 of planes defined by the points. Item 86 indicates that an edge AB is a direct line linking the points A and B, whereas item 87 denotes that an edge BD is a curve passing through the points B, C, G, and D. At the same time, item 88 designates that a plane ABCF is a rectangle having as vertices the points A, B, C, and F and item 89 designates a plane C, D, E, and F having as vertices the points C, D, E, and F. A group of boundary conditions 83 comprises boundary conditions satisfied on boundaries of the domain. A condition 810 specifies that variables u and v take a value of 0 on the edges BD and AE, namely, the fluid velocity is 0 on the wall surface. Similarly, conditions 811 and 812 denote a fluid velocity at the flow entry AB and a pressure and a velocity gradient at the flow exit DE, respectively. The partial differential equations 84 includes a group of partial differential equations dominating the physical phenomenon and variable names to be solved. Item 813 including "SOLVE u:2 v:2 p:1 OF" specifies that the following group of partial differential equations are to be solved with respect to the variables u, v, and p, that the variables u and v are to be interpolated by use of a quadratic basis function (FIG. 6), and that the variable p is to be interpolated by use of a linear basis function (FIG. 5). The subsequent items 814 to 816 are Stokes equations dominating a slow flow.

Figure 20:
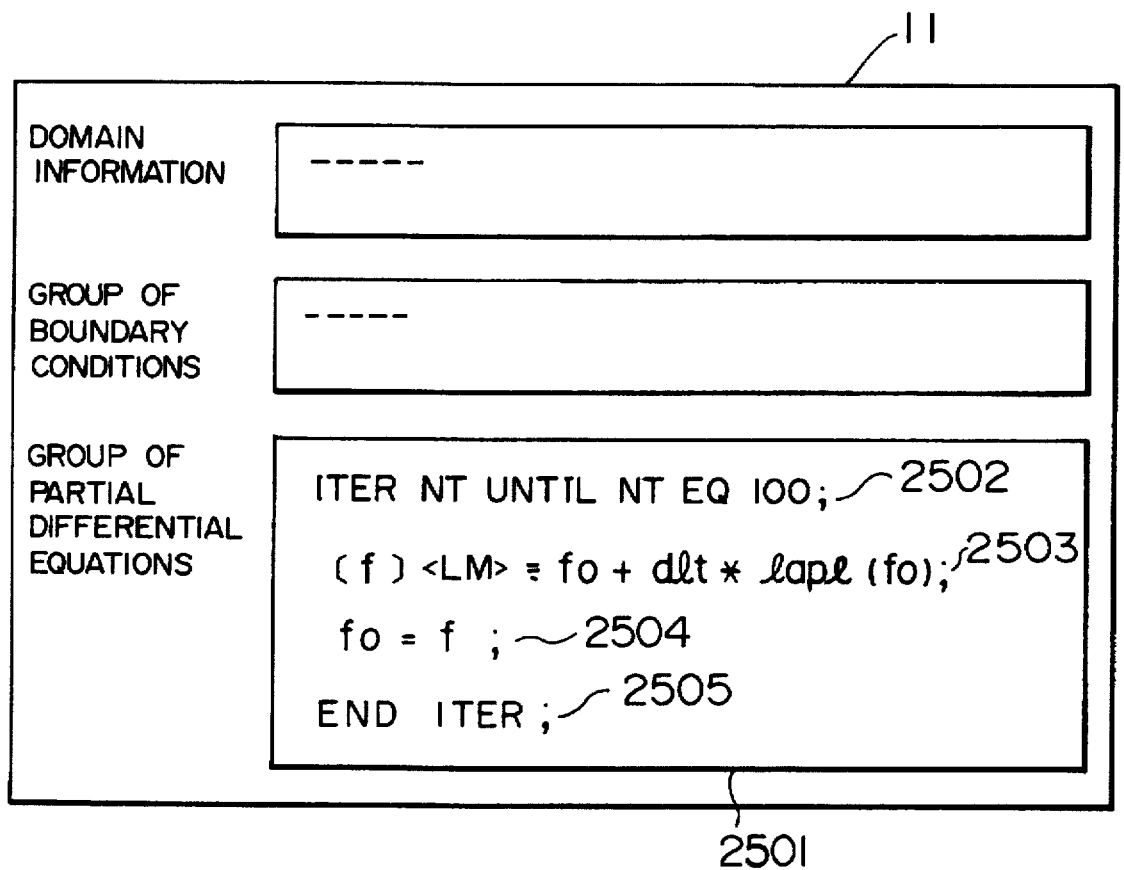
FIG. 20 is a schematic diagram showing simulation information containing a diagonarize specification of a coefficient matrix.

As another example, FIG. 20 shows an example of simulation information 11 including a specification of diagonization of a coefficient matrix. In this example, domain information and a group of boundary conditions are omitted because these items are not necessary for description of the diagonization of the coefficient matrix. A partial differential equation 2501 is a description example of a time-dependent heat transfer problem for the following specifications. Items 2502 and 2505 are paired specifications to indicate that steps 2503 and 2504 enclosed therebetween are to be repeatedly achieved until the condition associated with the "UNTIL" of the step 2502 and subsequent steps is satisfied. In this description, NT denotes a counter which is incremented by one for each execution of the loop, which is repeatedly effected 100 times in this example. The item 2503 is an explicit assignment computation related to time in the time-dependent heat transfer problem. By repetitiously achieving the operation of the item 2503, the distribution of temperature f can be sequentially attained for each point of time. The diagonization of the coefficient matrix is instructed as follows. That is, a variable as an object of the diagonization is enclosed with brackets [ ] and a keyword LM indicating the orthogonization enclosed with < and > is specified immediately there-after. In the example of the description 2501, the coefficient matrix associated with the variable f on the left side is instructed to be orthogonized. Item 2504 is an assignment computation for an update of the variable in which an old value f0 is replaced with the value of f attained in the step 2503 and a preparation is made for the computation of the subsequent time step.

Figure 9:
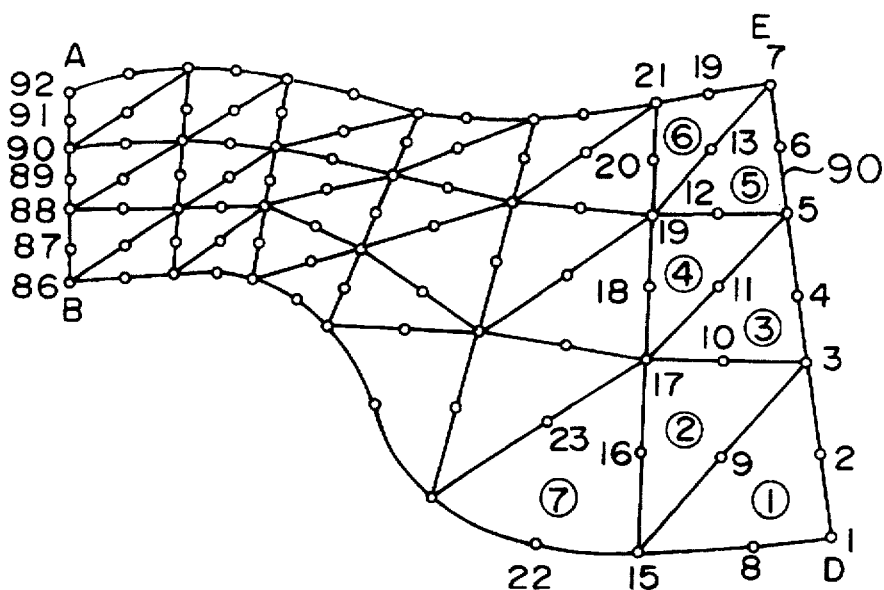
FIG. 9 is an explanatory diagram for explaining node element data.

A mesh segmentation part 24 referring again to FIG. 1 receives as an input thereto the simulation information 11 and then effects an element segmentation so as to produce node/element data 25. FIG. 9 shows an example of the node/element data 25 associated with the input information of FIG. 8. Since the maximum value of the degree of interpolation given for the group of partial differential equations 84 is 2 in the simulation information in FIG. 8, there are employed elements having intermediate nodes on edges as shown in FIG. 4. The node/element data 25 includes node data 91, element data 92, and subset data 93. The node data 91 includes coordinate values of the nodes in an order of the serial numbers (node numbers) assigned to the respective nodes. The element data 92 includes lists each comprising node numbers constituting respective elements in an order of the serial numbers (element numbers) assigned to the respective elements. The subset data 93 includes node numbers of nodes in the respective side and planes for each side title and each plane title of the domain information. These node/element information items 25 are read into an array by a computer 29 referring again to FIG. 1 when the FORTRAN program 26 is executed so as to be referenced for a numeric determination of components of the coefficient matrix and constant vector. In addition, the simulation result 110 is also outputted in the order of the node or element numbers.

Next, description will be given of the equation processing part 111 of FIG. 1, which is a central component of the present invention. The equation processing part 111 comprises a part 13 of pre-processing of equation for receiving as inputs thereto the group of boundary conditions 83 and the group of partial differential equations 84 of the simulation information 11 so as to transform the received items into equation information A 19 in a form such as a binary tree suitable for processing, a weight decision part 14 for determining an optimal weight function for each partial differential equation in the equation information A19 and for multiplying the weight function by the pertinent partial differential equation so as to transform the equation into an equation of an integration form to obtain equation information B 20, a partial integration execute part 15 for effecting a partial integration on the equation information B 20 so as to transform the equation information B20 into equation information C 21, a boundary condition collation/ introduction part 16 for establishing a one-to-one correspondence between the partial differential equations transformed into an integration form in the equation information C 21 and the group of boundary conditions so as to introduce the boundary conditions, thereby generating equation information D 22, a discretize part 17 for replacing the variables in the equation information D 22 with variable values at nodes through an interpolation and for exchanging the integration and the total with respect to the object variable, thereby generating equation information E 23, and a program output part 18 for generating a FORTRAN program which numerically obtains actual components from equations associated with the coefficient matrix and the constant vector in the equation information E23.

Subsequently, the function of the equation processing part 111 of FIG. 1 will be described along the operations thereof. As an example of the simulation information 11, the examples of FIGS. 8 and 20 will be used for the description.

Figure 10:
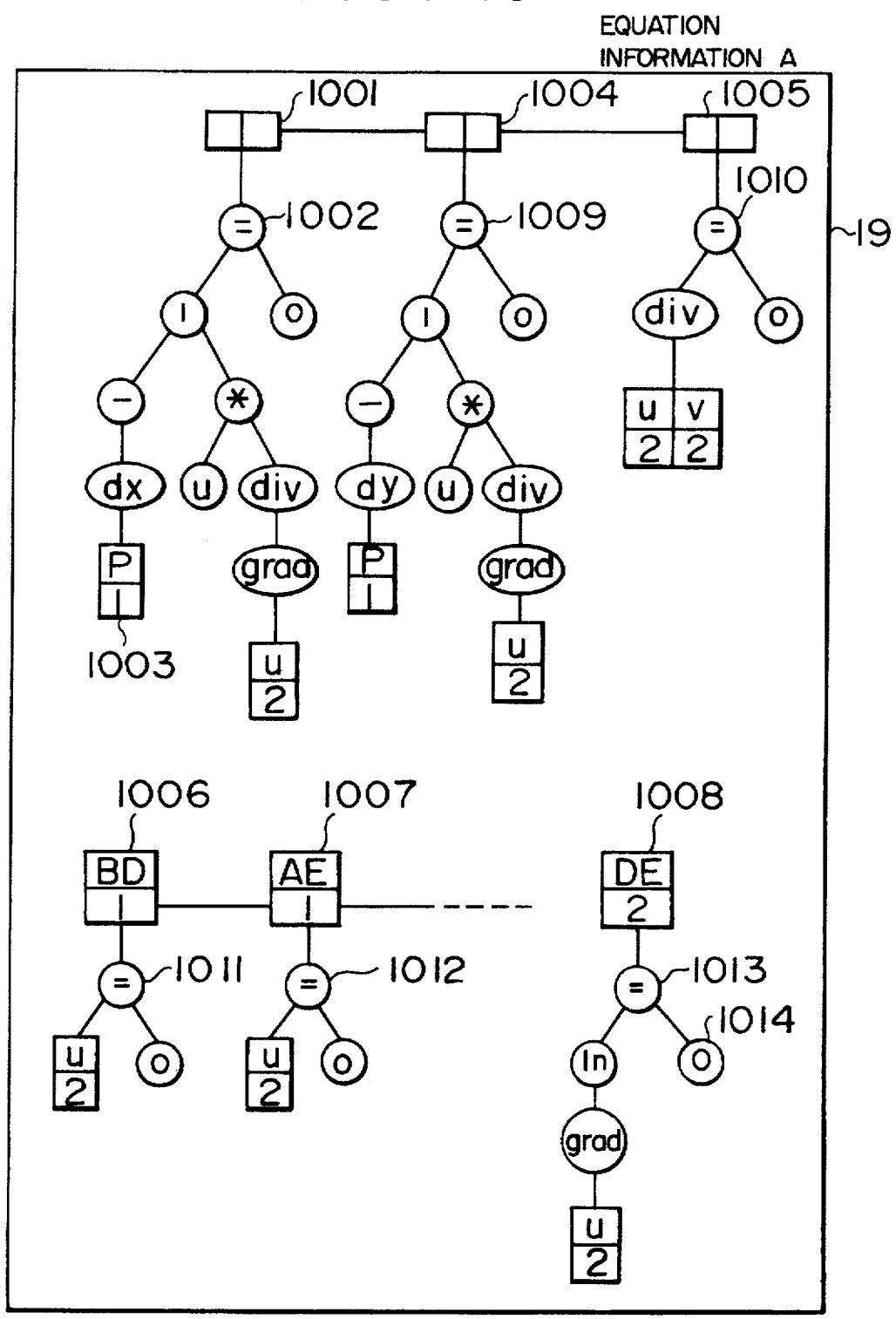
FIG. 10 is a schematic diagram useful to explain equation information A.
Figure 21:
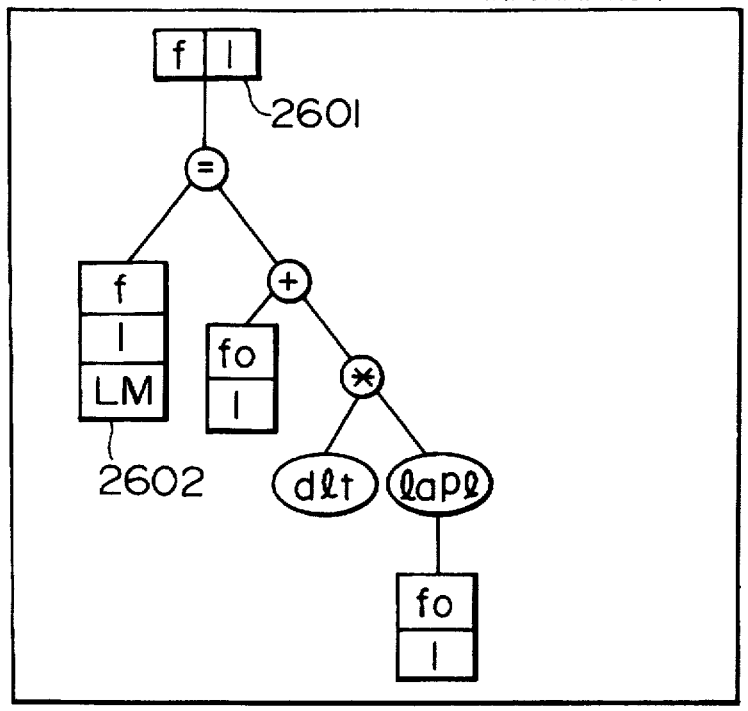
FIG. 21 is an explanatory diagram useful to explain equation information A containing a diagonarize specification of a coefficient matrix.
Figure 24:
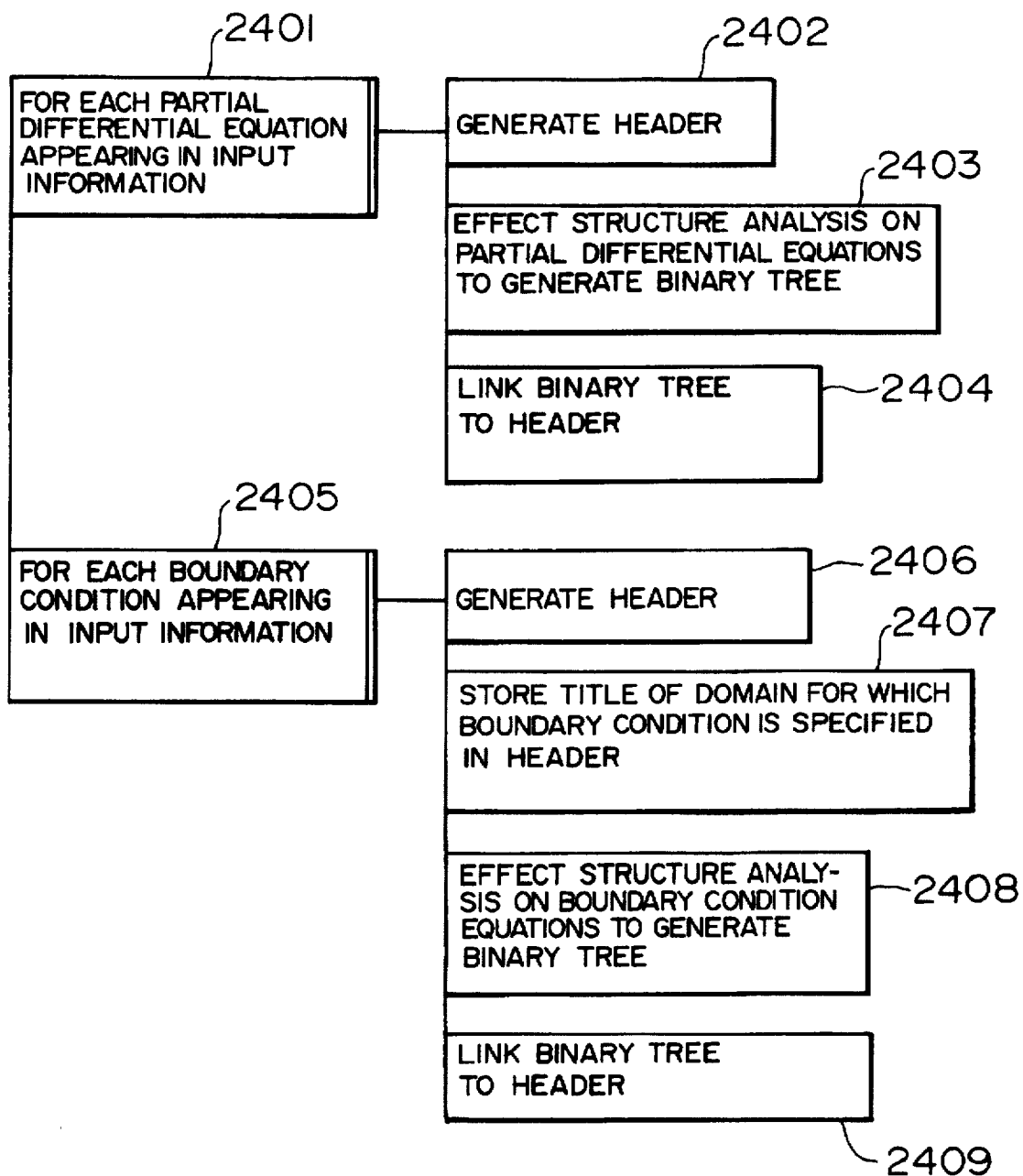
FIG. 24 is a flowchart of processing in a pre-processing of equation.
Figure 25:
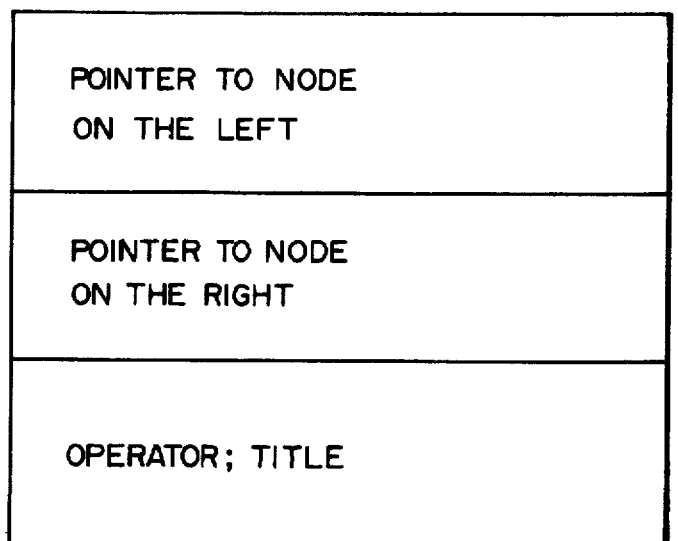
FIG. 25 is a schematic diagram showing the data structure of a node.
Figure 26:
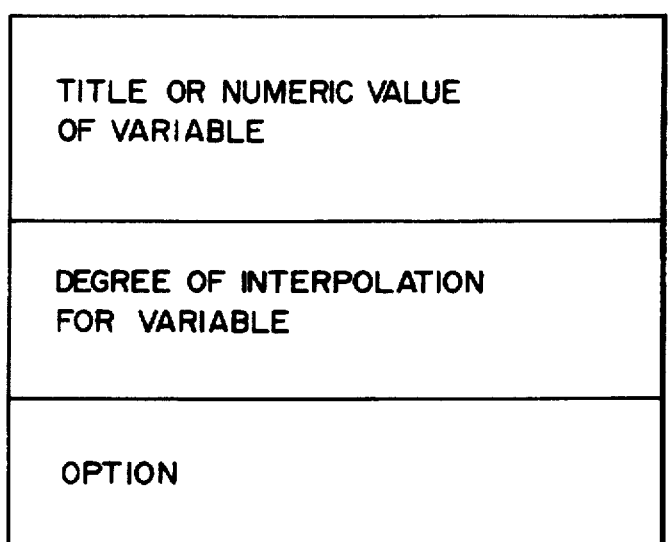
FIG. 26 is a diagram schematically showing the data structure of a terminal.

The part 13 of pre-processing of equation reads as inputs thereto a group of partial differential equations 84 and a group of boundary conditions 83 and transforms each equation into data in a form of a binary tree which facilitates processing, thereby producing the equation information A 19. FIG. 24 shows a flow of the processing. First, the partial differential equations are obtained from the simulation information 11 so as to generate a header for each partial differential equation (steps 2401 and 2402) and then a syntax analysis is effected on the partial differential equations based on a parsing method commonly adopted in an ordinary compiler or the like so as to produce a binary tree (step 2403), which is then linked to the pertinent header (step 2404). Next, the boundary condition equations are read from the simulation information 11 to generate a header for each boundary condition equation (steps 2405 and 2406), a title of a domain specified for the boundary condition is stored in the header (step 2407), and a syntax analysis is achieved on the boundary condition so as to produce a binary tree (step 2408), which is then linked to the pertinent header (step 2409). FIG. 10 shows a specific example of the equation information A 19 associated with the simulation information 11 of FIG. 8. Node 1002 and subsequent components form a binary tree for the first equation of the group of partial differential equations 84 of FIG. 8, node 1009 and subsequent components constitute a binary tree for the second equation thereof, and node 1010 and subsequent components form a binary tree for the third equation thereof. Similarly, nodes 1011, 1012, and 1013 constitute a binary tree for the group of boundary conditions. Each binary tree comprises nodes in which operators such as +, −, div, and grad are stored and terminals in which variable names u, v, etc. and numeric values such as 0 are stored. FIG. 25 shows a data layout of a node. In each node, there are stored pointers to nodes existing on the left and the right of the pertinent node and an operator title. In addition, FIG. 26 shows a specific data structure of a terminal. In each terminal, there are stored a title or a numeric value of a variable, a degree of interpolation for the variable, and an option for the variable. (The option includes a specification such as a diagonization of a coefficient matrix for the variable. An example of the option will be described later.) At vertices of each binary tree, there are disposed headers (1001, 1004, 1005, 1006, 1007, and 1008) storing attributes of the binary tree. A header for a boundary condition is used to store a title of a domain where the boundary condition holds and a classification of the boundary condition indicating the 1st or 2nd kind boundary condition. (Judgement of the boundary types will be described later.) A header for a partial differential equation is remained to be empty because a degree of a weight function and a title of an associated variable are to be later stored therein. In addition, in a case where a terminal of a binary tree contains a variable name, a precision associated with the degree of interpolation to be effected on the variable is attained from "u:2 v:2 p:1" of the group of partial differential equations 84 and then the obtained precision is stored in a pair together with the variable name. As another example, equation information A to be generated for the simulation information of FIG. 20 is shown in FIG. 21. In the group of partial differential equations 2501 of FIG. 20, there is specified a diagonization <LM> of a coefficient matrix for the variable f on the left side of an equation 2503. In association with this specification, LM is stored in the option field of a terminal 2602 corresponding to the equation information A of FIG. 21, which indicates that the coefficient matrix is to be diagonized when the variable is discretized.

Next, the weight function decision part 14 referring again to FIG. 1 determines the degree of the weight function to be multiplied by the respective partial differential equation based on the weight function determining method described above and then stores the result in a header of the second binary tree. Based on the obtained information, each partial differential equation is multiplied by the pertinent weight function, thereby effecting an integration.

Next description will be given of a processing procedure in the weight function decision part 14. When discretizing a simultaneous system of partial differential equations according to the finite element method, a weight function is required to be multiplied by each partial differential equation of the simultaneous system. It is accordingly necessary to determine a weight function (of a certain degree) to be multiplied by a partial differential equation. For this purpose, there is established a one-to-one correspondence between the respective partial differential equations of the simultaneous system and the object variables to be solved according to the following rules.

① In a case where a term of div(A.grad(f)) (A is a coefficient tensor) exists for each partial differential equation of the simultaneous system and A contains diagonal components, if a variable f for which the correspondence has not been established is an object variable, there is established a correspondence between f and the partial differential equation. In a case where a plurality of such terms exist in a partial differential equation, the correspondence is established between the first object variable which appears therein and for which the correspondence has not been established and the partial differential equation.

② In a case where there remain object variables and partial differential equations for which the correspondences have not been established as a result of the operation 1 above, the same operation step 1 is effected again for the object variables and the partial differential equations. In this case, however, the correspondence is to be established by paying attention to terms having a tensor A not including orthogonal components.

③ In a case where there still remain object variables and partial differential equations for which the correspondences have not been established as a result of the operation 2 above, the correspondence is established between the object variables and the partial differential equations according to the following rules. For a partial differential equation including only 1st-order derivatives with respect to the object variable, the correspondence is established for an object variable not included in the equation.

④ In a case where there still remain object variables and partial differential equations for which the correspondences have not been established as a result of the operation step 3 above, the correspondence is established between the object variables and the partial differential equations according to the predetermined order of the object variables.

After the one-to-one correspondence is thus established through the operations above, a weight function having a degree identical to an interpolation degree of the pertinent object variable is assumed to be the weight function of the partial differential equation. Description has been given of the processing procedure of the weight function decision part 14 determining a weight function for a partial differential equation.

Figure 11:
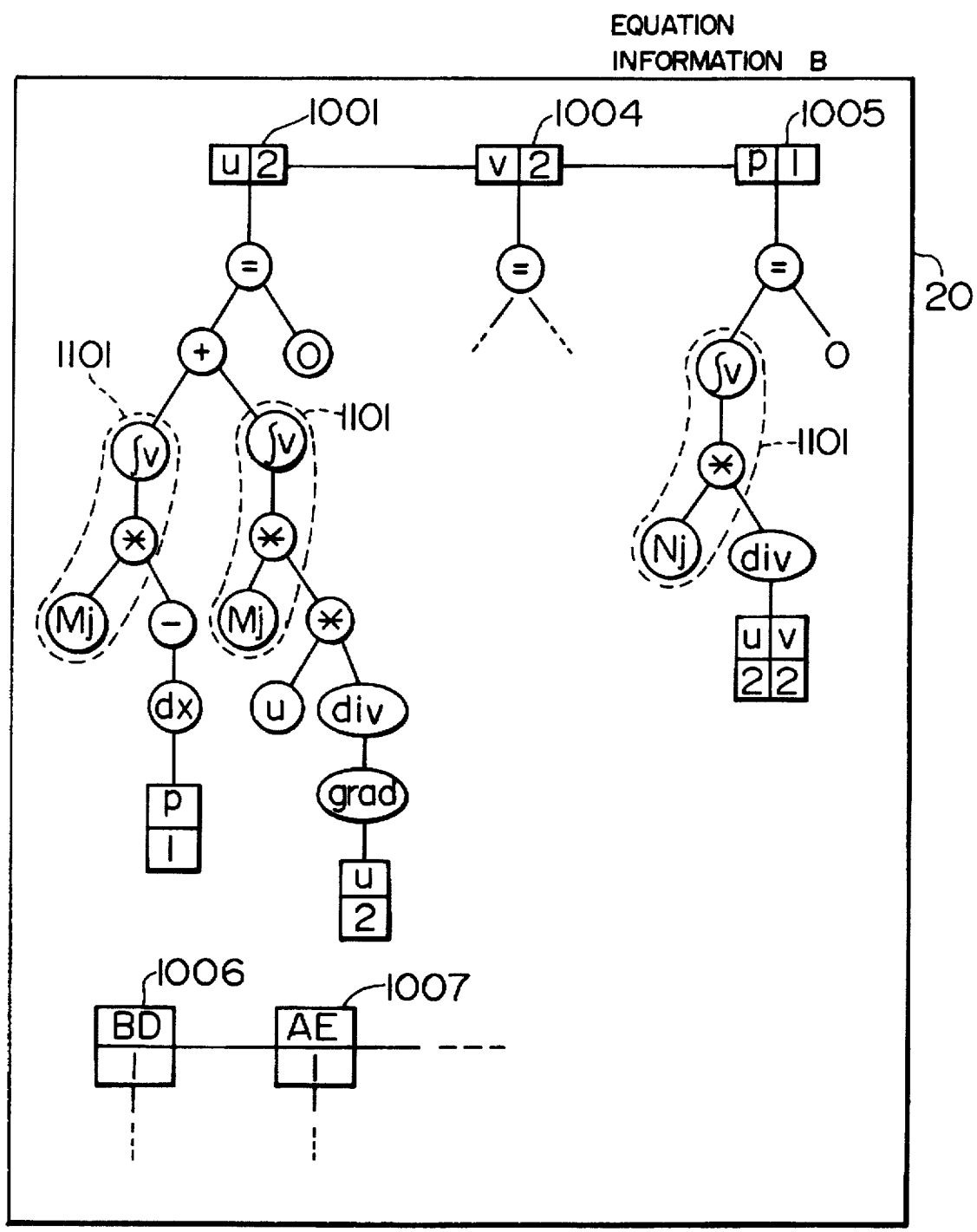
FIG. 11 is a schematic diagram useful to explain equation information B.
Figure 27:
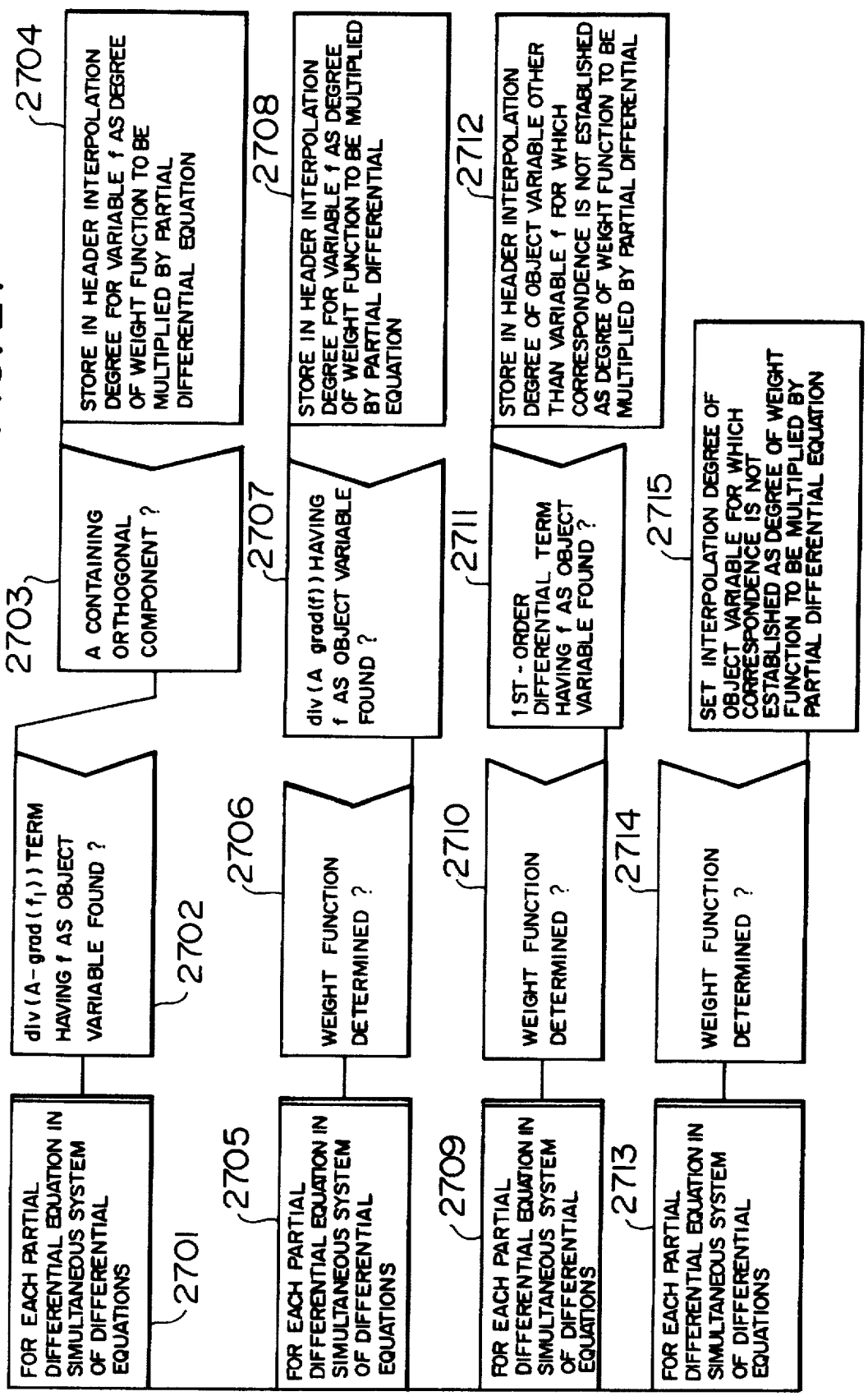
FIG. 27 is a flowchart of processing of a weight function decision part.

FIG. 27 shows a processing flow of the weight function decision part 14 according to the processing procedure above. For the example of the equation information A 19 of FIG. 10, the processing is achieved as follows. First, rule ① is applied to the first equation associated with the node 1002 and subsequent components of FIG. 10. In the first equation, the argument is u for the node of grad below the node of div and there is not assigned any coefficient to grad; in consequence, the coefficient tensor can be judged to be a unit tensor. That is, the coefficient tensor A can be regarded to include orthogonal components, and the variable u is judged to correspond to the first equation according to the rule ①. As a result, the header 1001 is loaded with the variable name u and 2 as the interpolation degree. In a similar fashion, also for the second equation, the associated variable is judged to be v and hence the variable title v and 2 as the interpolation degree are stored in the header 1004. For the third equation, there is established a correspondence for a variable p other than the variables u and v; in consequence, a correspondence is established between the header 1005 and the variable title p, namely, the header 1005 is loaded with the variable title p and 1 as the interpolation degree. (Since the third equation and the variable p remain for the further processing when there are established correspondences between the first equation and the variable u and between the second equation and the variable v, there may be directly established a correspondence between the third equation and the variable p without using the rule ③.) Multiplying each equation by a weight function to effect an integration in the pertinent domain. In the operation of the binary tree, paying attention to the node of + below the node of =, a subtree (1101 of FIG. 11) including a combination of the node of ∫v representing an integration of a domain, the node of *, and a weight function is inserted therebelow. FIG. 11 shows equation information B 20 attained as a result of the operation. Here, the linear and quadratic weight functions are represented as $N_j$ and $M_j$, respectively.

Figure 12:
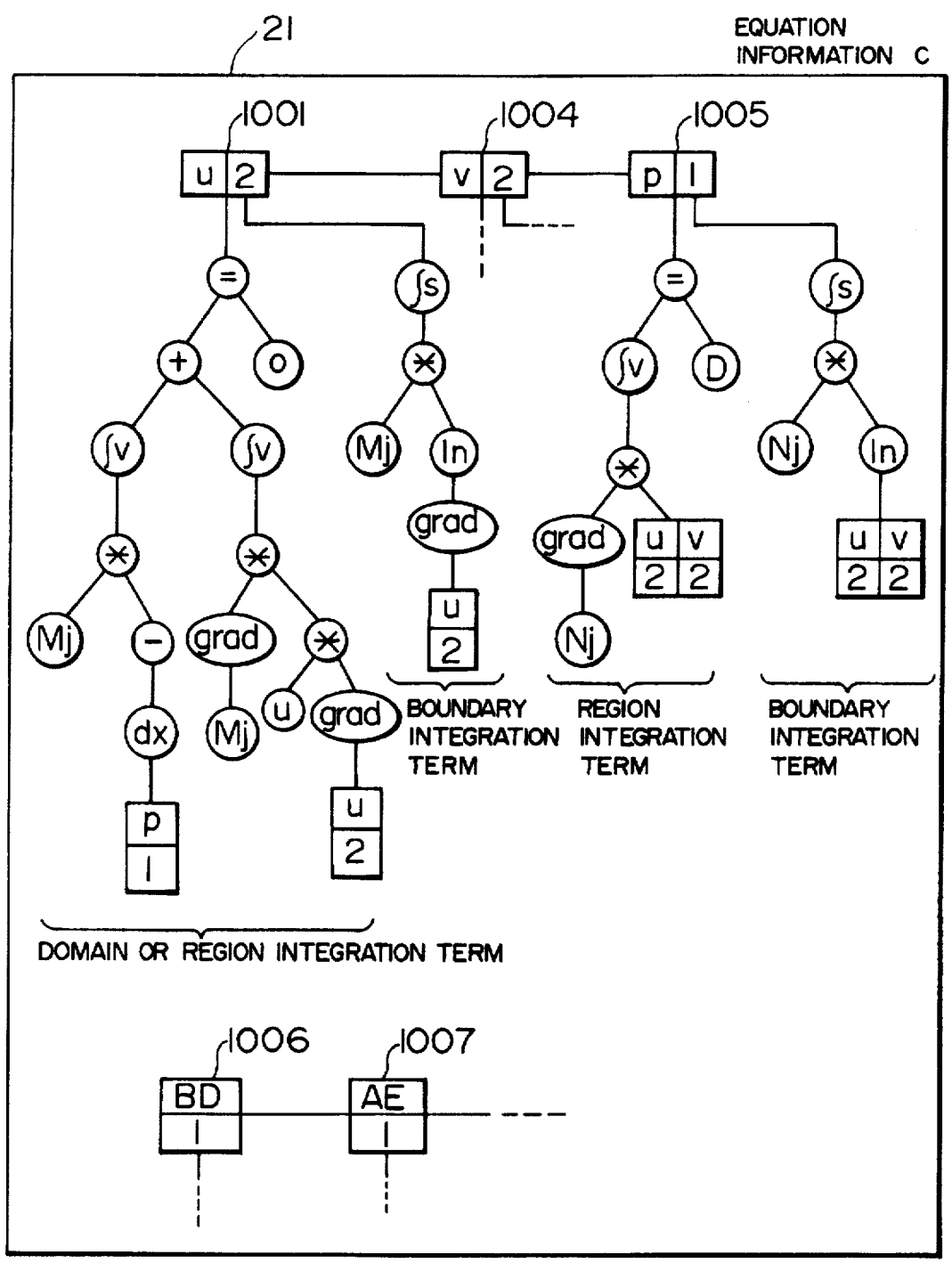
FIG. 12 is a schematic diagram useful to explain equation information C.
Figure 29:
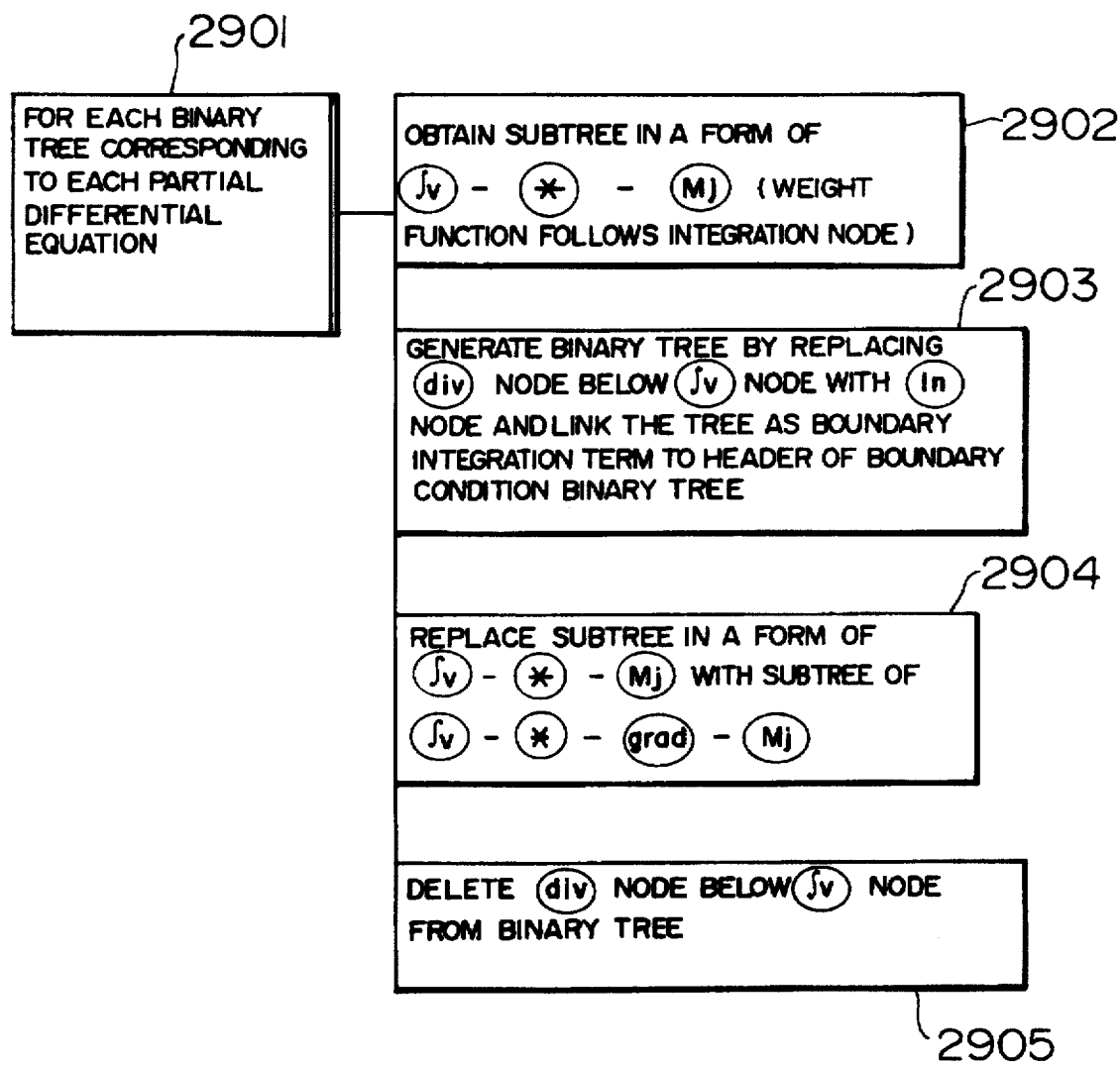
FIG. 29 is a flowchart of processing of a partial integration execute part.

In the subsequent partial integration execute part 15, a partial integration is conducted on the integration term in the equation information B 20. FIG. 29 shows a flow of processing in the partial integration execute part 15. The operation for the binary tree is achieved such that a node of grad is added to the integration of the domain at a position before the weight function (steps 2901, 2902 and 2903) and the node of div below the node of ∫v is deleted (steps 2904 and 2905). At the same time, a term of an integration on a boundary appearing due to the partial integration is linked to a position below the header of the binary tree of the boundary condition (step 2903). The boundary integration term is attained by arranging the node of ∫s representing the boundary integration, the node of * subsequent thereto, a weight function and a node of n representing a product with respect to a normal vector respectively following the node of *, and a subtree which follows the node of n and which is equivalent to the portion of the node of div and subsequent component of the domain integration term. FIG. 12 shows equation information C 21 attained as a result of the processing effected on the equation information B 20 of FIG. 11.

Next, in the boundary condition collation/introduction part 16, referring again to FIG. 1 according to the boundary condition introducing method described above, a correspondence is established, for each boundary domain, between each partial differential equation and a boundary condition, thereby introducing the boundary conditions. First, as a pre-processing of the boundary condition introduction, titles of boundaries for which boundary conditions are defined are attained through the headers (1006, 1007, etc. of the FIG. 12) of the binary tree of the boundary conditions so as to link the information items to follow the header of the partial differential equation, thereby producing a boundary domain title header. Next, for each partial differential equation, a boundary condition to be introduced is determined for each boundary domain. Description will be next given of the procedure to be effected in this situation for establishing a one-to-one correspondence between the partial differential equations and the boundary condition equations.

First, the given boundary conditions are classified into 1st and 2nd kind boundary conditions. FIG. 7 shows criteria for the boundary condition classification. Next, the correspondence is established between the 2nd kind boundary conditions and partial differential equations. In this operation, the integral term of the boundary integration attained from each partial differential equation is sequentially compared with each boundary condition, and when there is found a boundary condition including all integral terms therein, the correspondence is established between the pertinent partial differential equation and the boundary condition. In a case where there remains a 2nd boundary condition for which the correspondence cannot be established with respect to any partial differential equation, the boundary condition is not introduced. Subsequently, there are established correspondences between 1st kind boundary conditions and the remaining partial differential equations. In this case, the correspondences are established according to the following rules.

⑤ The correspondence is established between a 1st kind boundary condition and a partial differential equation associated with a weight function having a degree identical to the interpolation degree of the object variable of the 1st kind boundary condition.

⑥ When the object variable of a 1st kind boundary condition is identical to a variable associated with a 2nd-order differential in a partial differential equation, the correspondence is established between the 1st kind boundary condition and the partial differential equation.

⑦ When an object variable of a 1st kind boundary condition is equal to a variable only associated with a 1st-order differential in a partial differential equation, the correspondence is not established between the 1st kind boundary condition and the partial differential equation.

In these rules, the priority levels are assigned thereto in the order of the rules ⑤, ⑥, and ⑦. Furthermore, in a case where the correspondence cannot be uniquely determined according to the rules above, the correspondence is to be determined according to the predetermined orders of the partial differential equation and the boundary condition. After there are established the correspondences between the boundary conditions and the partial differential equations according to the rules above, the 2nd kind boundary conditions are replaced with the boundary integration terms of the partial differential equations, whereas the 1st kind boundary condition is replaced with the partial differential equation itself. However, when there remain partial differential equations for which the correspondences cannot be established for the 1st and 2nd kind boundary conditions, the boundary integration terms of the partial differential equations are replaced with 0. Description has been given of the procedure to establish the one-to-one correspondences between a simultaneous system of partial differential equations and the boundary conditions in the boundary condition collation/ introduction part 16.

Figure 13:
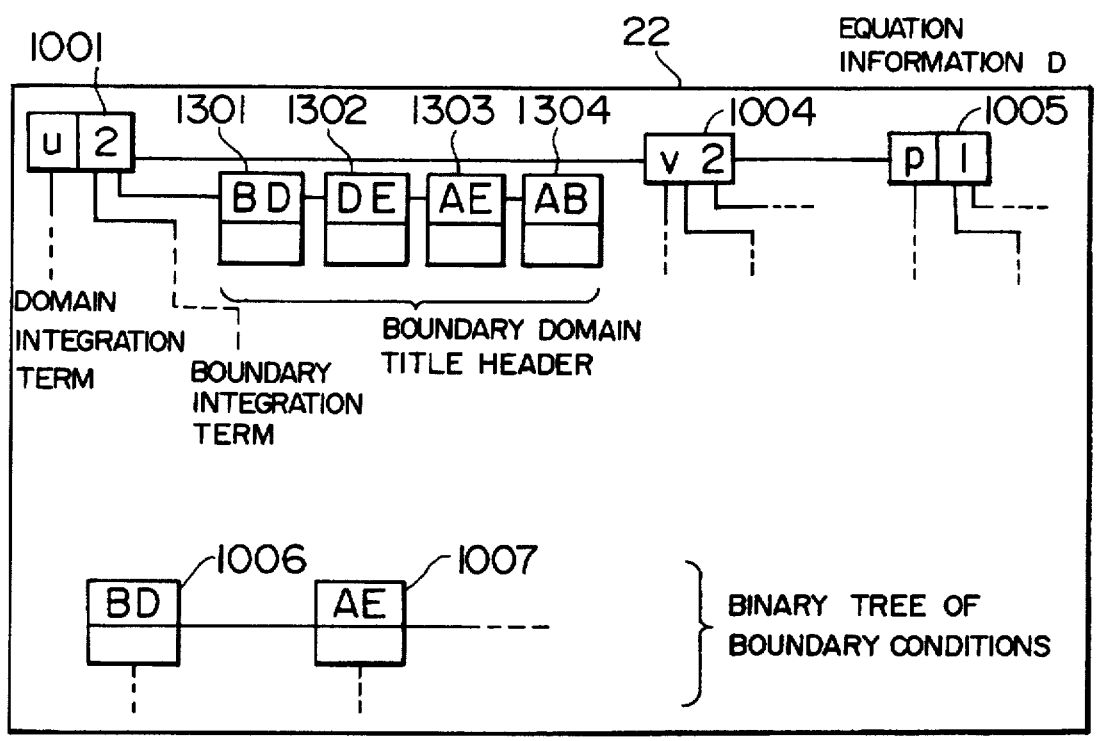
FIGS. 13 and 14 are schematic diagrams useful to explain equation information D.
Figure 14:
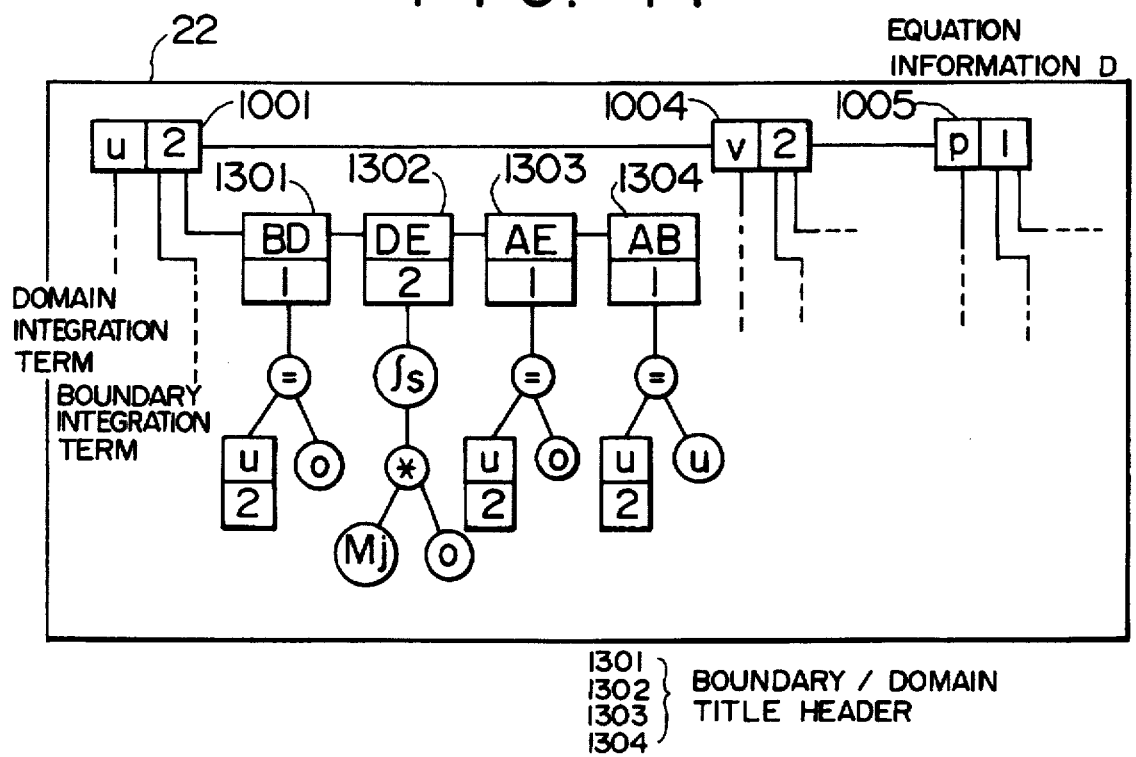
Figure 28:
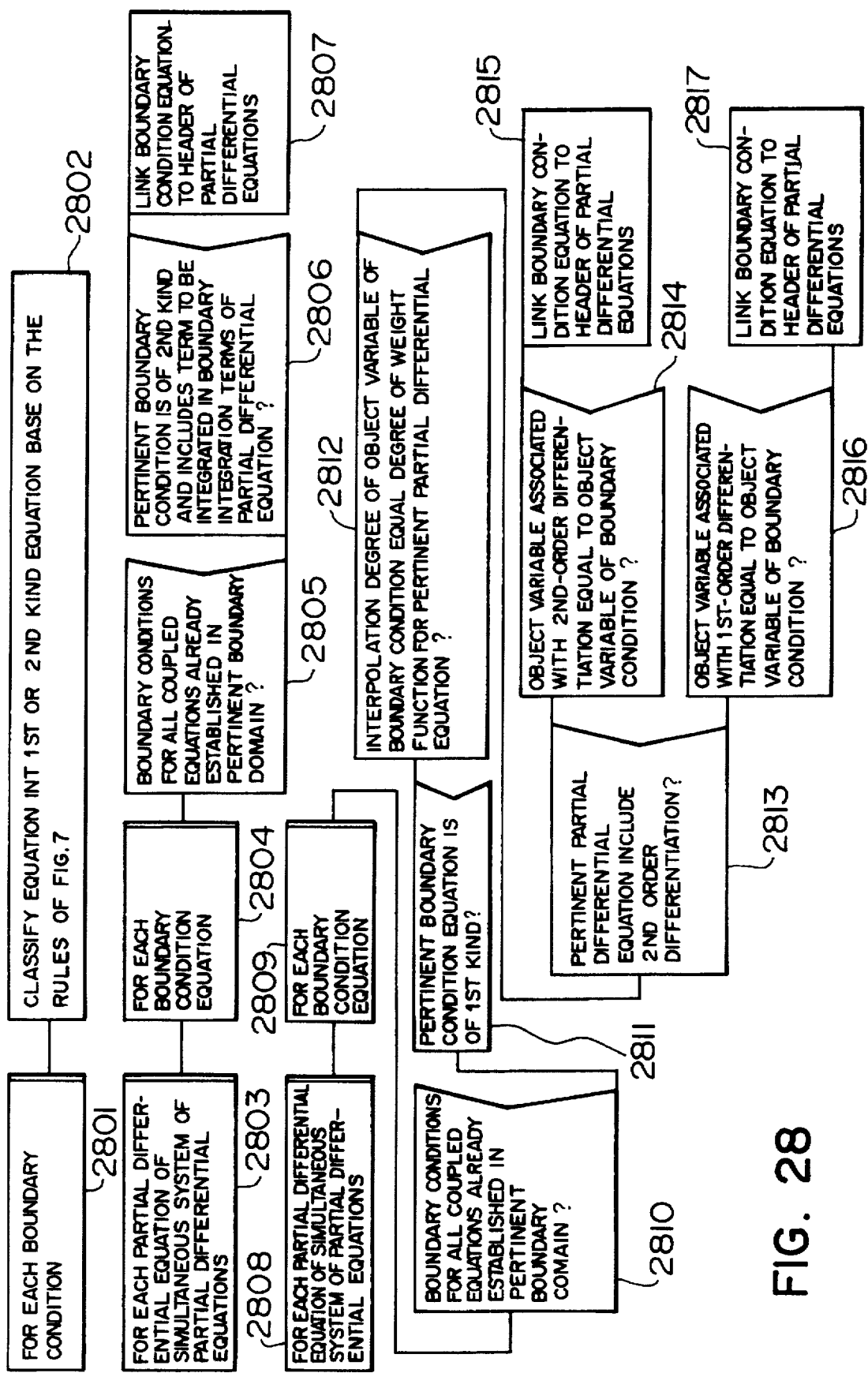
FIG. 28 is a flowchart of processing of a boundary condition collate part.

FIG. 28 shows a flow of processing to establish the correspondences between the partial differential equations and the boundary conditions according to the procedure above. Description will now be given in detail of the flow of processing with reference to the example of FIG. 13. Through searching for the headers of the binary tree of the boundary conditions with respect to the domain BD 1301 associated with the first equation 1001 of FIG. 13, it is found that there does not exist any 2nd boundary condition. (Refer to the group of boundary conditions 83 of FIG. 8 for details.) As a result of the check effected on the 1st kind boundary conditions, it is found that two conditions of u=0 and v=0 are specified. Referencing the header 1001 of the first equation, it is known that the variable u corresponds to the first equation; in consequence, u=0 is selected as the boundary condition for the header BD of the first equation. Accordingly, the binary tree 1006 associated with u=0 in the binary tree of the boundary condition is deleted and the content thereof is copied onto the boundary domain title header 1901. In the similar fashion, by checking the headers of the binary tree of the boundary conditions for the second boundary domain DE in the first equation, it is found that n(grad(u))=0 and n(grad(v))=0 are specified as 2nd kind boundary conditions. Based on the boundary condition introducing method described above, it is checked to determine whether these conditions can be replaced with boundary integration terms of the first equation. The replaceability can be judged by use of the binary tree as follows. First, checking the boundary integration terms beginning from the header of the first equation so as to pay attention to the n node and subsequent nodes. (Refer to the item 1008 of FIG. 10 for details.) If the n node and subsequent components in these information items completely match with each other, the item can be introduced as a 2nd kind boundary. Let us consider here n(grad(u))=0. This equation satisfies the condition above with respect to the boundary integration terms of the first equation and hence can be introduced. In consequence, the subtree below the n node of the boundary integration term is replaced with a subtree (refer to the item 1014 of FIG. 10) extending from the node of = of the boundary condition binary tree to the right and the result is stored below the header 1302. In addition, the binary tree for the boundary condition n(grad(u))=0 introduced here is deleted from the boundary condition binary tree 1008. When the operations above are accomplished for all boundary domains, the introduction of the boundary conditions is completed. FIG. 14 shows the equation information D 22 in this situation. If there remains a boundary domain not satisfying the corresponding boundary condition, it is assumed that a 2nd boundary condition having the boundary integration term =0 is satisfied on the boundary, and then a subtree in which the n node and subsequent components of the boundary integration term are replaced with 0 is linked to the pertinent boundary condition title header. Contrarily, in a case where a boundary condition which cannot be accepted is specified, the binary tree associated with the boundary condition is not deleted and is hence kept remained up to the final point. In this situation, it is possible to proceed to the next processing by ignoring the remaining binary tree or to output a warning message.

Figure 15:
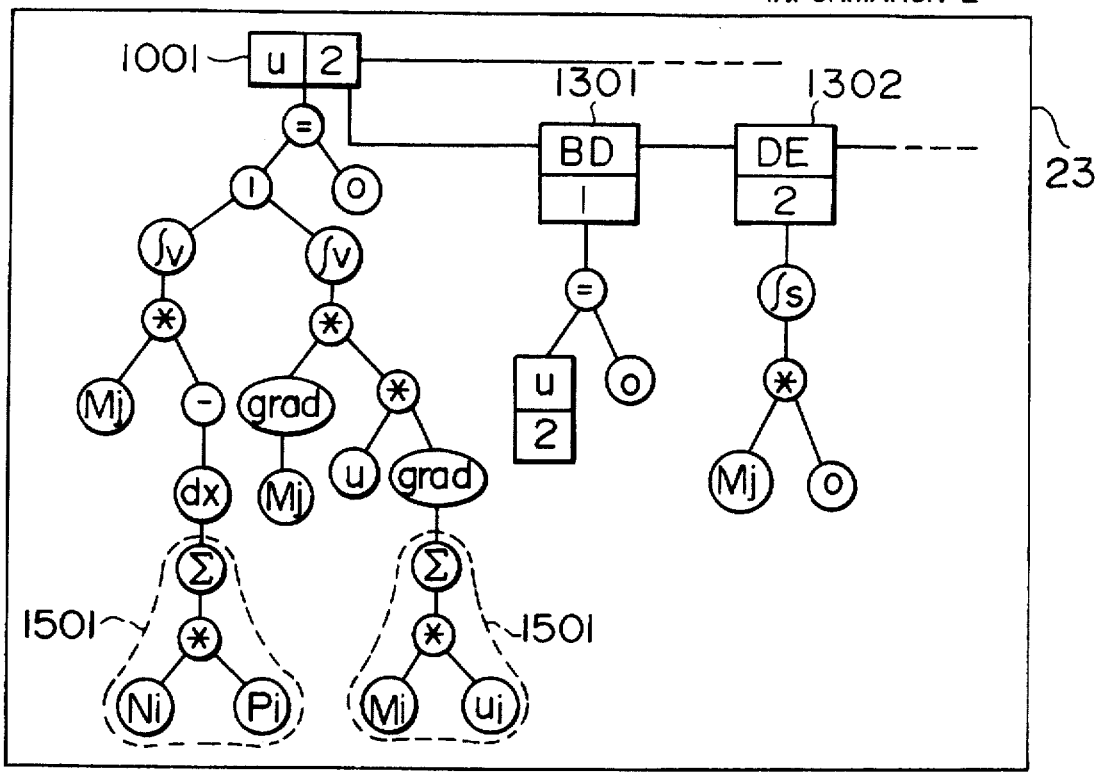
FIGS. 15 and 16 are schematic diagrams useful to explain equation information E.
Figure 16:
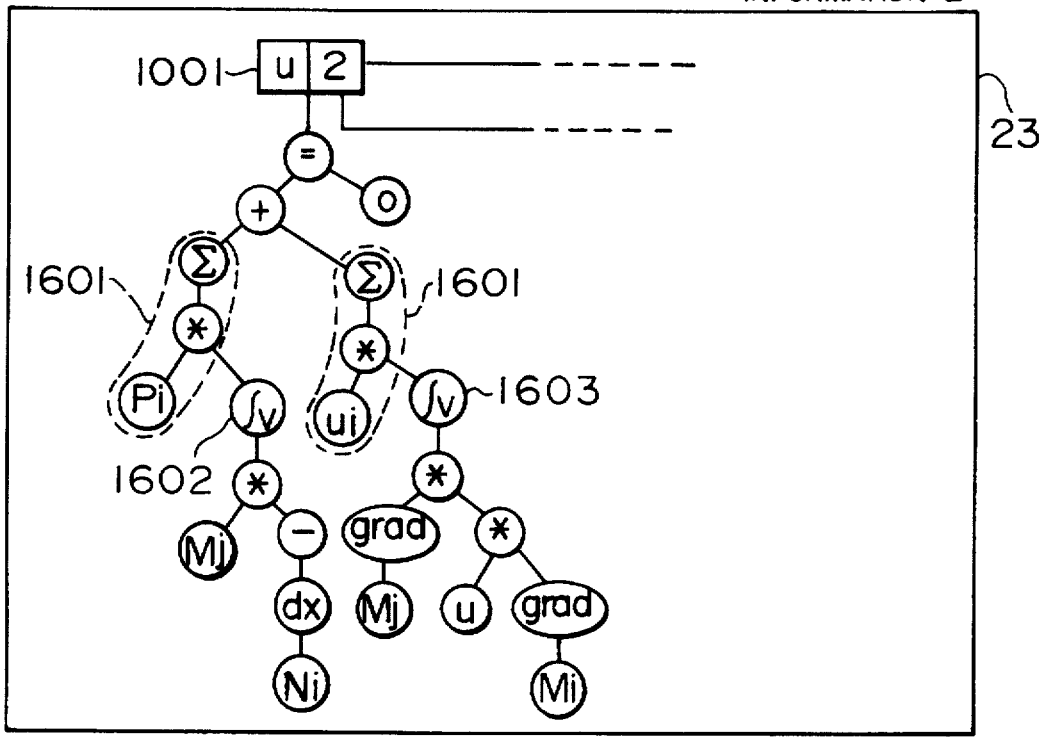
Figure 22:
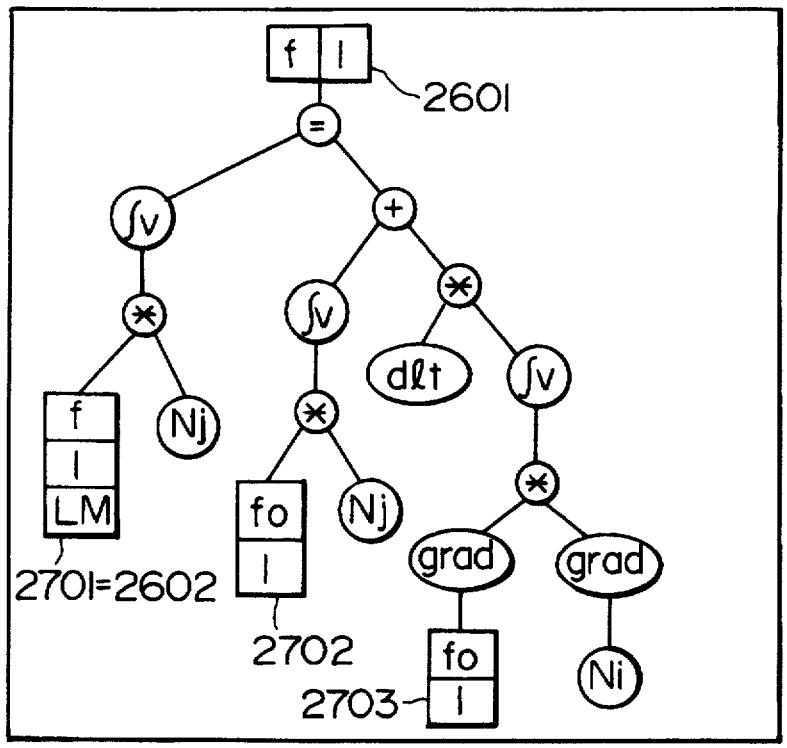
FIG. 22 is an explanatory diagram useful to explain equation information D containing a diagonarize specification of a coefficient matrix.
Figure 23:
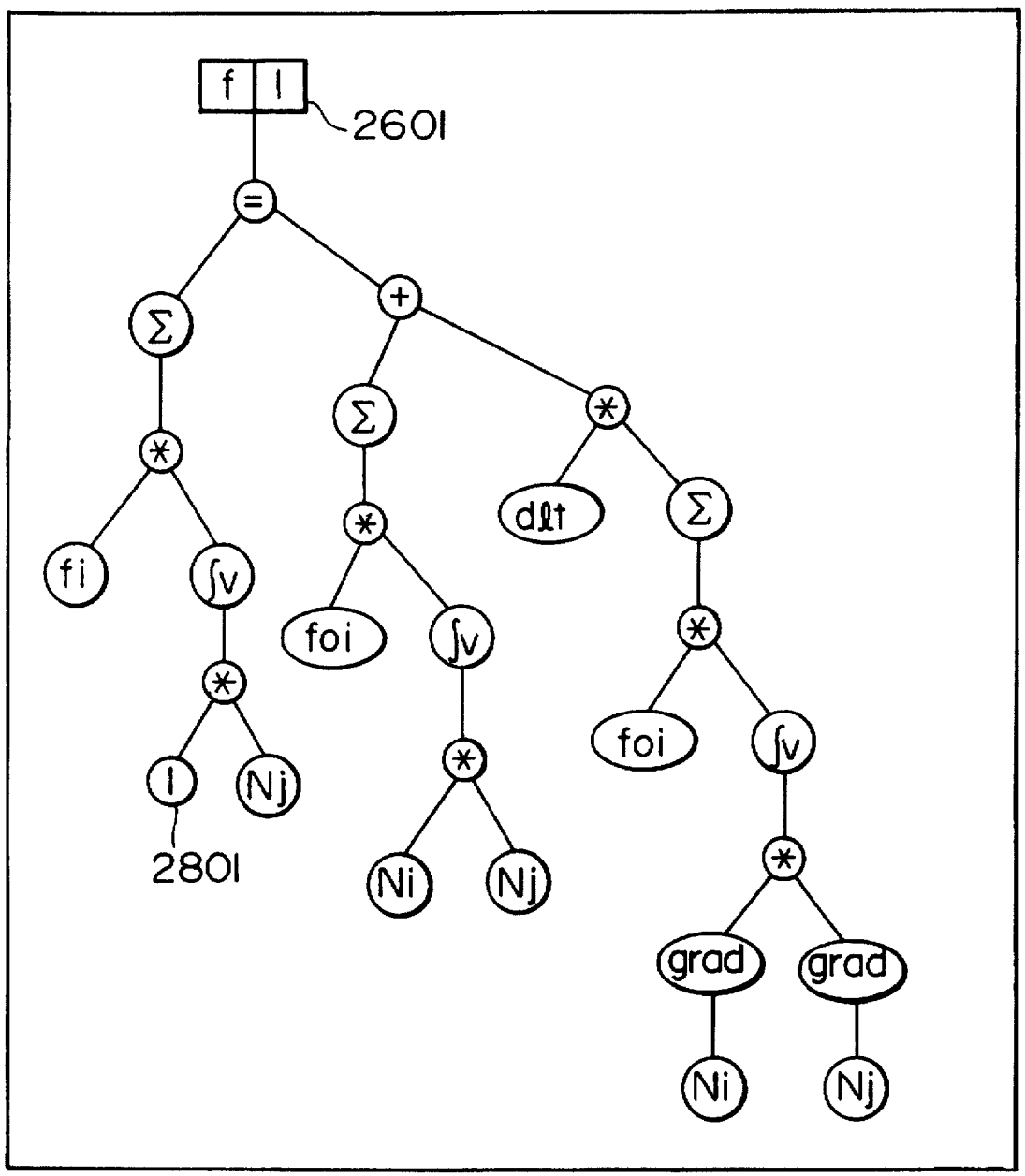
FIG. 23 is an explanatory diagram useful to explain equation information E containing a diagonarize specification of a coefficient matrix.

Next, in the discretization part 17 (FIG. 1), the variables are replaced by use of an interpolation with variable values on nodes and then the order of the integration and the summation is exchanged for an object variable so as to move the integration of the object variable to a position outside the integration. FIG. 30 shows a flow of processing in the discretization part 17. The replacement of the variable by use of the interpolation expression can be effected in the binary tree as follows. In a case where a variable is found in a terminal through a check effected on a binary tree, the variable is replaced with a subtree (1501 of FIG. 15) comprising a Σ node representing a summation, a * node, a basis function name ($N_j$ or $M_j$), and a discretization variable name (attained by adding a subscript i to the variable) (step 3002). For the check of the basis function Ni and Mi, the interpolation degree stored in a pair with the variable name is referenced such that Ni or Mi is used when the degree is 1 or 2, respectively. FIG. 15 shows the equation information E 23 at this point. In addition, the operation to move the object variable to a position outside the integration is implemented such that when there exists an object variable (discretized) in a terminal of a binary tree, the Σ node, the * node, and the basis function linked thereto are moved to a position immediately before the ∫v node (step 3003). (Refer to item 1601 of FIG. 16 for details.) FIG. 16 schematically shows the state representing the operation. Incidentally, the discretize operation need not be particularly achieved for a binary tree of a 1st kind boundary condition. In addition, when there exists a term 2701 associated with a specification of a diagonization of a matrix as shown in FIG. 22, Ni or Mi appearing for the discretization thereof is replaced with 1 (step 3005). As a result, the equation information E of FIG. 23 can be obtained.

The transformation of the equations is completed as described above, and then the program output part 18 generates a FORTRAN program based on the equation information E 23 which is the final result of the equation transformation. The primary function of the program output part 18 is to generate a FORTRAN program which produces a simultaneous system of linear equations corresponding to the discretized partial differential equations, namely, a coefficient matrix and a constant vector. Prior to an explanation of the processing method of the program output part 18, an example of a coefficient matrix to be finally generated will be described with reference to FIG. 19. The coefficient matrix is a square matrix 1902 having as the dimension the number of equations (or the number of object variable * number of nodes). The values attained by evaluating the coefficient equations (the node 1602 of ∫v and subsequent components of FIG. 16 form a coefficient equation for pi; similarly, the node 1602 of ∫v and subsequent components thereof constitute a coefficient equation for ui) associated with object variables obtained by the discretization are assigned to the matrix. For example, in a case where the index of the weight function $M_j$ appearing below the node 1602 takes a value of k and the index of the basis function Ni is 1, the values resulted from the evaluation thereof are stored in the shaded portion 1901 of FIG. 19.

Figure 17:
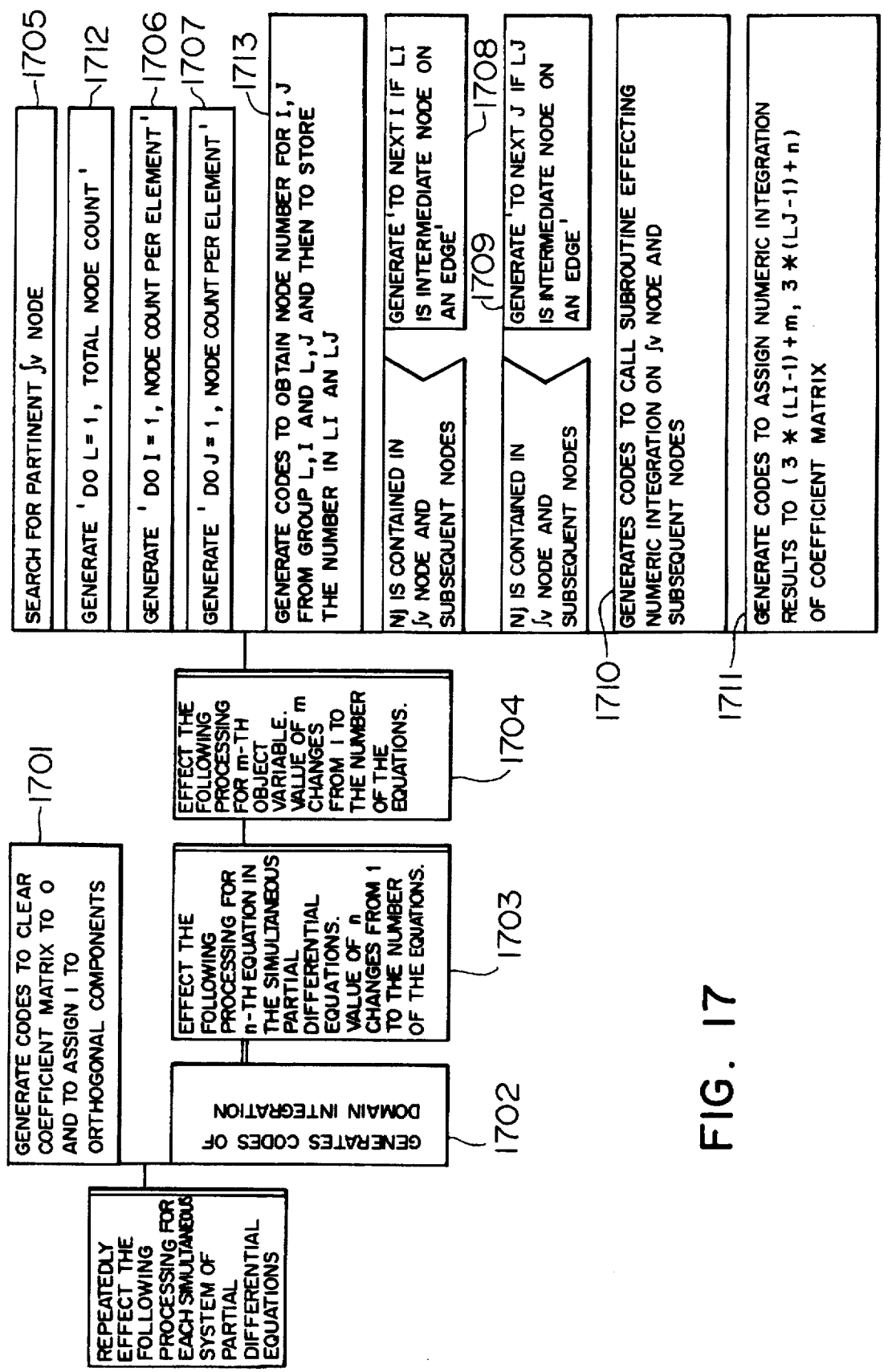
FIGS. 17 and 18 are flowcharts showing the processing of a program output part.
Figure 18:
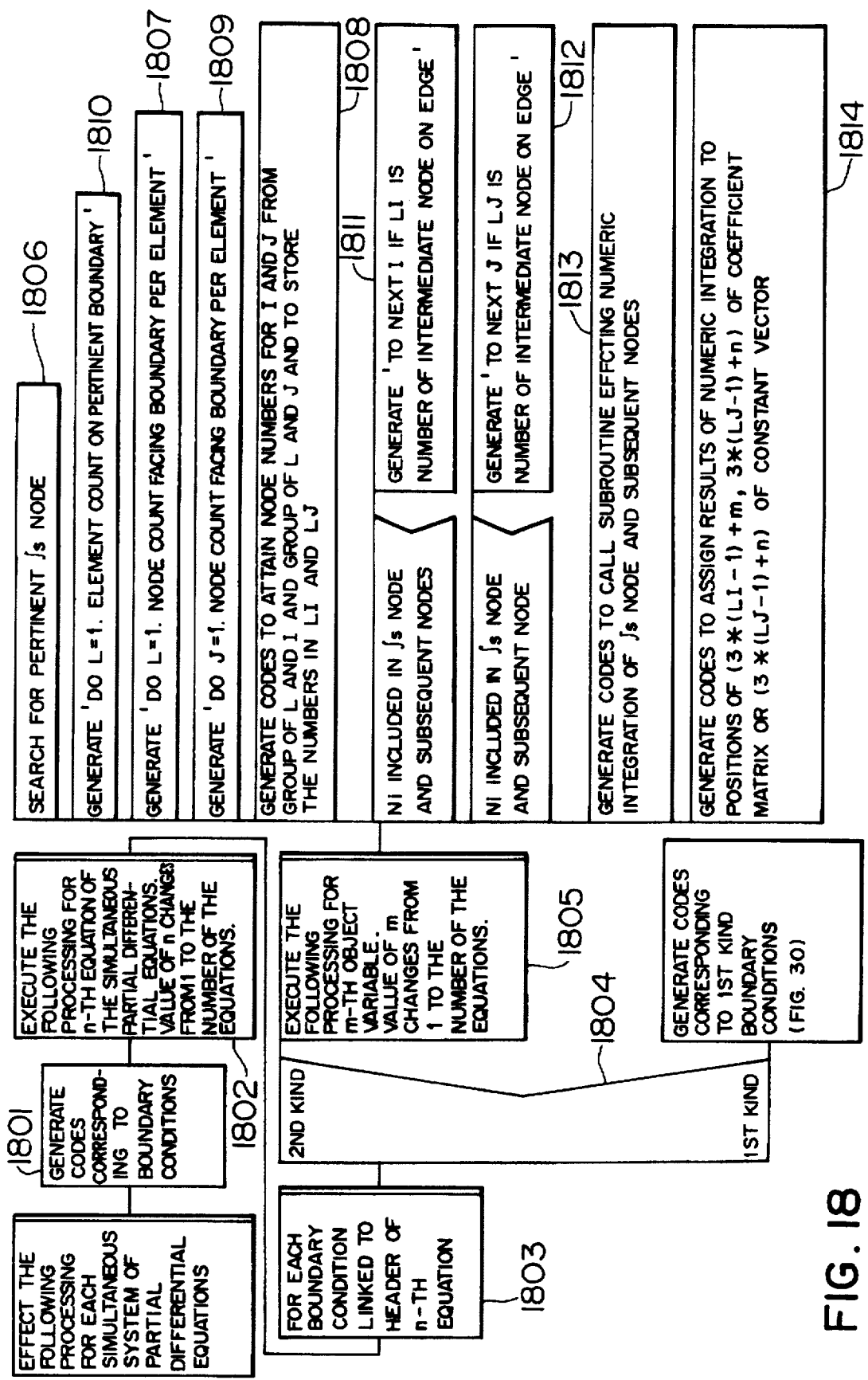

The store operation of data in a coefficient matrix in a FORTRAN program 26 (FIG. 1) conforms to the rules above; more specifically, the values of i and j are changed through operations of DO loops, and the same processing, if possible, is executed by use of the same program portion. FIGS. 17 and 18 show the processing methods of generating the DO loop and of storing data in the coefficient matrix in the program output part 18.

FIG. 17 shows a program output method with respect to a domain integration term. In step 1701, the coefficient matrix is transformed into a unit matrix. This is means to avoid an occurrence of a singular matrix, i.e., for example, when a weight function of the third equation (816 of FIG. 8) is not defined at intermediate nodes on the edges (located at the intermediate points of the respective edges in FIG. 4) and all components of the row for the nodes are hence 0, the matrix becomes to be singular. Steps 1703 and 1704 are loops for effecting a program generation for all equations and variables, respectively. In these steps, the equations and the variables to be processed and determined; consequently, the program generation is achieved for the variables and equations in the subsequent steps. In step 1705, an equation for which a coefficient matrix is to be evaluated is determined from the equation information E 23. Steps 1706 and 1707 generate, together with step 1712 DO, loops to effect a scanning operation on the basis and weight functions for all nodes. Steps 1708 and 1709 skip the evaluation on the node for which neither variables nor equations are defined.

Figure 19:
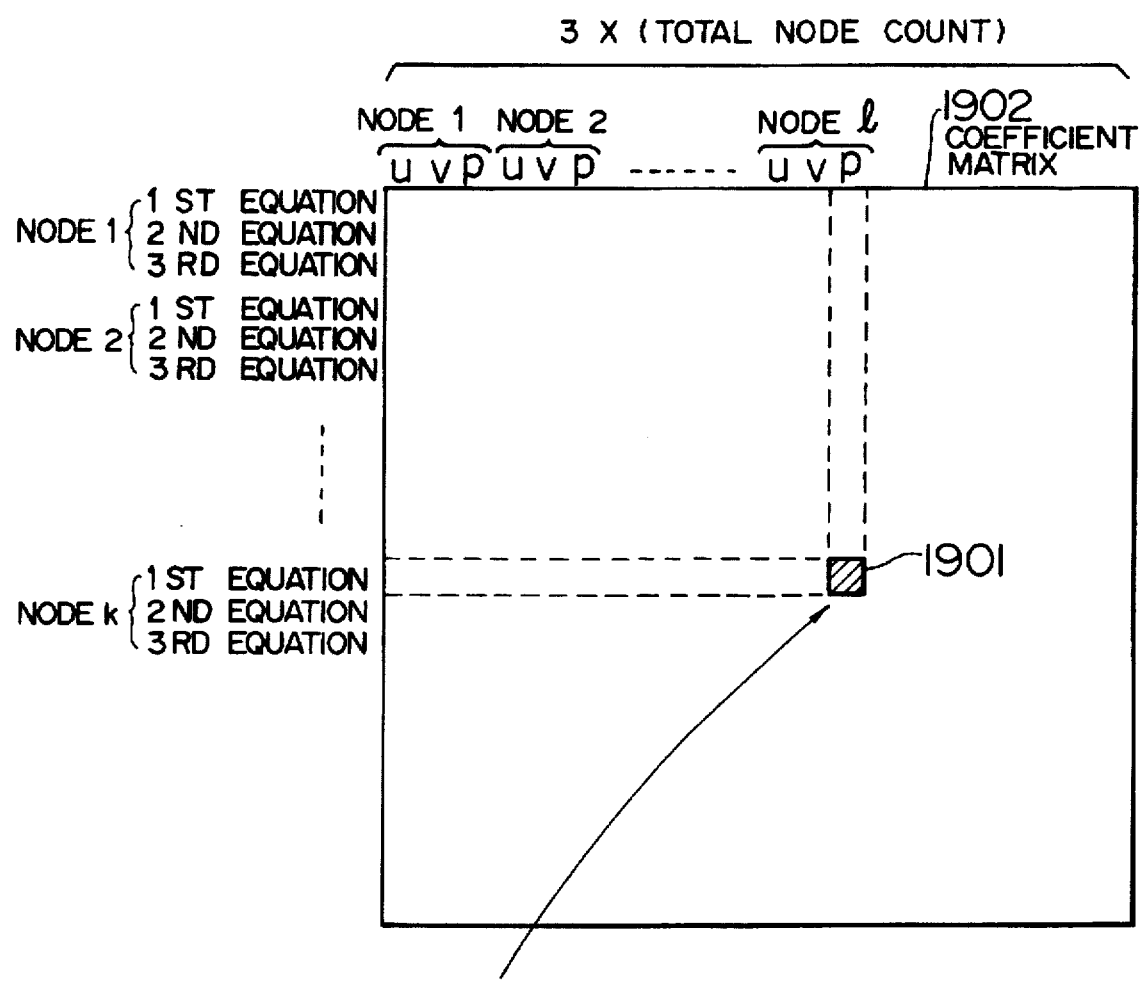
FIG. 19 is a diagram schematically showing the configuration of a coefficient matrix.

In step 1710, a numeric integration is actually executed to generate a program evaluating the coefficient values, and then, step 1711 generates a program to store coefficient values in the corresponding positions of the matrix as shown in FIG. 19.

FIG. 32 shows an example of a FORTRAN program generated from the program output part 18 through the evaluation of the first term (the coefficient of p) of the equation information E 23. Lines 3202 and 3203 are codes respectively indicating that the equation to be processed is the first partial differential equation and that the variable to be processed is the third object variable (p). Lines 3204 to 3206 include codes respectively generated in the steps 1712, 1706, and 1707 of FIG. 17, which are DO loops for effecting the scanning operations on the basis and weight functions for all nodes. MESHNO and NODES (L) respectively denotes the total element count and the number of nodes contained in the L-th element. Lines 3207 and 3208 are codes to attain a node number of the pertinent node. IADATA (I, J) stands for a table to store therein a node number of the J-th node of the I-th element. Lines 3209 and 3210 are codes designating judge sentences to skip the nodes for which neither basis functions nor weight functions are defined. INTER (I) designates a table for storing therein 1 in a case where the I-th node is an intermediate node on an edge and 0 in other cases. Line 3211 is a code to call a subroutine IFUNC achieving a numeric integration on $\int vMjdx(ni)$. SFNX and SFM respectively function to define dx(ni) and Mj. Furthermore, VAL denotes a variable receiving a result of the integration. Line 3212 is a code which sums up the integration result in the associated position of the coefficient matrix COEF.

Figure 31:
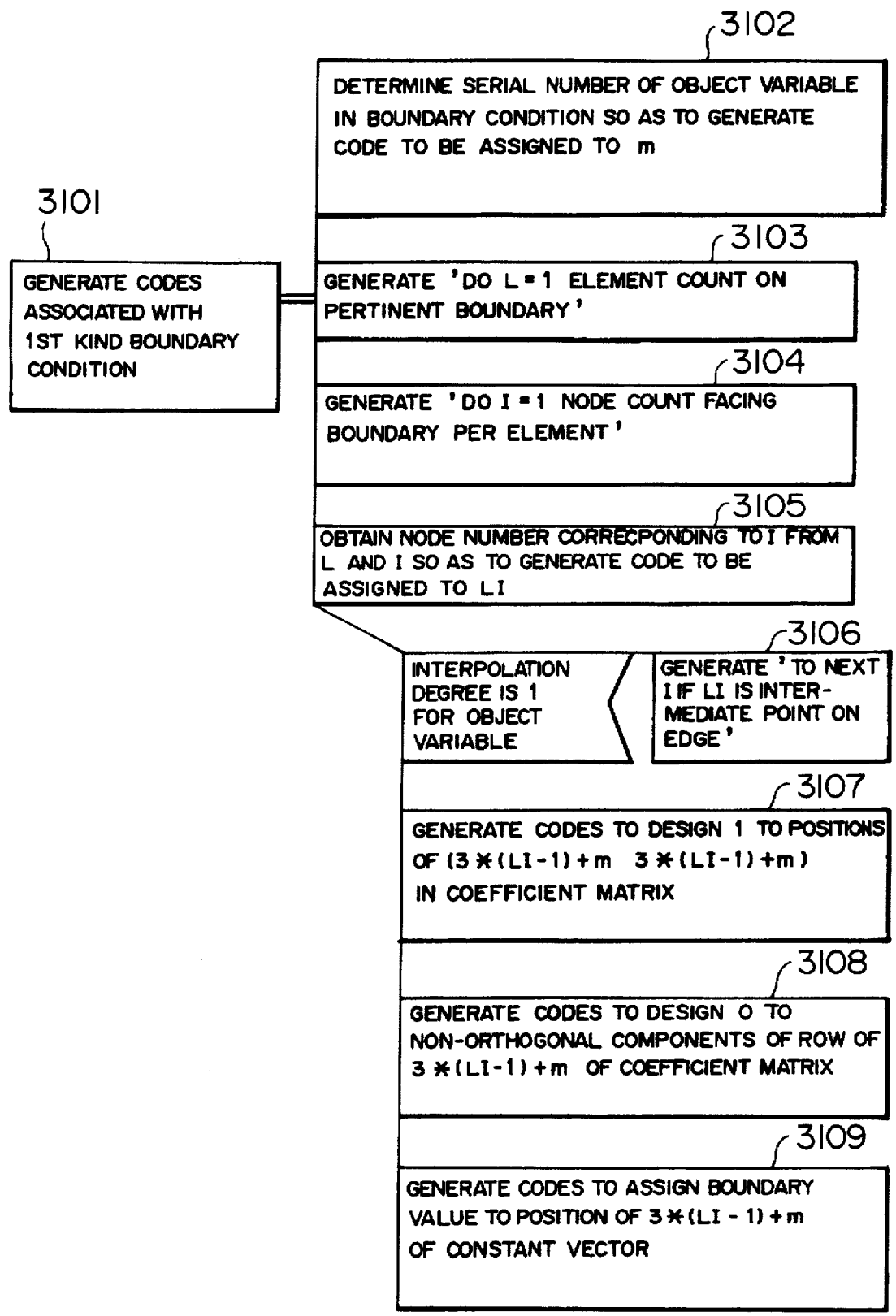
FIG. 31 is a flowchart of processing of a program generate part for a first kind boundary condition.

FIG. 18 shows a method of outputting a FORTRAN program associated with boundary conditions. Unlike the case of the domain integration, a plurality of boundary domain correspond to an equation and hence there is added step 1803 designating a loop to scan the boundary domains. In addition, since the 1st and 2nd kind boundary conditions are to be processed in the respective different methods, step 1804 is inserted to distribute the processing flow. Although the processing of the 2nd kind boundary conditions are almost the same as that of the domain integration, it is necessary to generate a program to attain node numbers on the respective boundaries (steps 1808 and 1810). On the other hand, the method of outputting a FORTRAN program associated with the 1st kind boundary conditions is as shown in FIG. 31. Like in the case of the domain integration, after the DO loops are generated, steps 3107 and 3108 respectively generate program portions to set 1 and 0 to the diagonal elements and the other elements of the corresponding row of the coefficient matrix, and then step 3109 produces a program portion to assign a boundary value (the value of c in u=c) to the associated position of the constant vector.

Description has been given of an embodiment according to the present invention.

Although the embodiment has been described in conjunction with a Stokes fluid and a time-dependent heat transfer problem, the characteristic of the present invention resides in that any types of partial differential equations can be processed, for example, the present invention is directly applicable to various problems which are described by use of a group of partial differential equations of second or lower order. In addition, for simplification of explanation, a two-dimensional problem has been described; however, the automatic program generation is possible also for a three-dimensional problem in completely the same fashion.

According to the present invention, it is possible to appropriately generate a FORTRAN program for a group of partial differential equations having a broad range including a case where the variables are to be interpolated with the different precisions. Such a simultaneous system of partial differential equations is employed in a wide range of fields associated with a fluid, an impurity diffusion, a semiconductor device, a structure, etc. and in these fields, the coupled partial differential equations lead to a disadvantage that the programming by the human power becomes quite difficult. With the provision of the automatic program generating means to cope with the above noted problems in such fields, the number of program development steps and the cost required for the program development can be greatly reduced.

We claim:

1. A program generation method for automatically generating, by use of a computer, a simulation program which is used in simulating a physical phenomenon and is written in a program language which cannot describe a differential operator from an input program which describes the physical phenomenon and is written in a program lanuagage which can describe a differential operator, comprising the steps executed by said computer of:

inputting to said computer input information in the form of said input program written in a program language which can describe a differential operator having simultaneous partial differential equations dominating said physical phenomenon, a group of boundary conditions, and a domain where said physical phenomenon takes place; and performing operations in said computer on said input information according to a finite element method to generate said simulation program including the steps of:

multiplying weight functions by said simultaneous partial differential equations, performing a partial integration on results of said multiplying step, effecting a processing for introducing each boundary condition of said group of boundary conditions to an appropriate one of said simultaneous partial differential equations, performing a discretize processing on variables to be solved in simultaneous partial differential equations obtained after said effecting a processing step, so as to produce simultaneous linear equations on said variables, and generating, from said simultaneous linear equations, said simulation program written in a program language which cannot describe a differential operator, for calculating values of elements of a coefficient matrix and a constant vector which are used to solve said simultaneous linear equations through a linear computation, said generated simulation program being used for simulating said physical phenomenon.

2. A program generating method according to claim 1, wherein said step of multiplying said weight functions automatically includes a step of selecting an optimal weight function for each partial differential equation of said simultaneous partial differential equations.

3. A program generating method according to claim 1, wherein said step of effecting a processing for introducing includes a step of automatically selecting a boundary condition, for each partial differential equation, from said group of boundary conditions, said selected boundary condition being suitable for said each partial differential equation.

4. A program generating method according to claim 1, wherein said step of performing a discretize processing includes a step of exchanging a summation operation and an integration operation included in results obtained by the step of effecting a processing for introducing.

5. A program generating method according to claim 1, wherein said step of performing a discretize processing includes a step, operative when specified in said input information, of changing an interpolation function to be employed so as to diagonize a coefficient matrix to be configured in said program to be generated.

6. A program generating method according to claim 1, wherein the generated program includes a program in which an index is duplicated when components are assigned to a coefficient matrix to be configured.

7. A program generation method for automatically generating, by use of a computer, a simulation program used in simulating physical phenomenon and is written in a program language which cannot describe a differential operator from an input program which describes the physical phenomenon and is written in a program lanaguage which can describe a differential operator, comprising the steps, executed by said computer of:

(a) inputting to said computer input information in the form of said input program written in a program language which can describe a differential operator having simultaneous partial differential equations (PDE's) which govern plural unknown quantities and a group of boundary conditions each to be satisfied on the boundary at least by one of the plural unknown quantities; and (b) performing operations in said computer on said input information according to the finite element method to generate said simulation program including the steps of:

(b1) generating, based upon the PDE's and the group of boundary conditions, a first mathematical expression for an arbitrary matrix coefficient ($a_{ij}$) of a matrix equation ($a_{ij}$) ($f_j$)=($c_j$) and a second mathematical expression for an arbitrary constant term ($c_j$) of the matrix equation, wherein first suffixes (i, j) of the matrix coefficients ($a_{ij}$) denote different combinations of the PDE's and nodes located on element regions included in a calculation object region and second suffixes (j) of the matrix equation denote different combinations of the nodes and the unknown quantities, and wherein a set of solutions ($f_j$'s) related to one unknown quantity of the matrix equation enables a value of the one unknown quantity at an arbitrary point within the calculation object region to be calculated by a sum of products each of a respective solution ($f_j$) related to the one unknown quantity and a weight function ($N_j$) related to the one unknown quantity, and (b2) generating said simulation program written in a program language which cannot describe a differential operator for calculating values of the matrix coefficients ($a_{ij}$'s) and the constant terms ($c_j$) in response to the generated first and second mathematical expressions, said generated program being used for simulating said physical phenomenon;

wherein the step (b1) further includes the steps of:

(b1-1) determining an order of a weight function to be used in subsequent partial integration of a respective PDE, (b1-2) performing a partial integration on each of partial differential equations multiplied by respective weight functions of respective orders determined by the step (b1-1) for respective partial differential equations, wherein the partial integration is executed over an element region of the calculation object region, (b1-3) introducing the group of boundary conditions into results of the partial integration on part of the PDE's, wherein introducing of one of the group of boundary conditions into one result of the partial integration on one of the PDE's includes either replacing the one result by the one boundary condition, or replacing a term included in the one result by an equivalent term determined by the one boundary condition, and (b1-4) generating the first and second mathematical expressions in response both to the results of the partial integration obtained by the partial integration performing step (b1-2) and to results obtained by the introducing step (b1-3).

8. A method according to claim 7, wherein determination by the determining step (b1-1) of an order is effected in response to weight-function orders predetermined for the unknown quantities.

9. A method according to claim 8, wherein the predetermined weight function order for a respective unknown quantity is designated by information included in the input information.

10. A method according to claim 7, further comprising the step of:

(c) determining correspondence among the unknown quantities and the PDE'S, so that different ones of the unknown quantities correspond to different ones of the PDE;

wherein the weight function order determining step (b1-1) comprises the step of determining an order of a weight function of a respective PDE as being equal to an order of a weight function predetermined for one of the unknown quantities which is determined as corresponding to the PDE.

11. A method according to claim 10, wherein the correspondence determining step (c) is effected depending upon kinds of terms appearing in a respective PDE.

12. A method according to claim 10, wherein the correspondence determining step (c) includes the step of:

(i) determining one (f) of the unknown quantities as a corresponding one-to-one of the PDE's which includes a term of a form div (A.grad f), wherein A is a tensor which has non-zero diagonal elements and a dot designates a scalar product.

13. A method according to claim 12, wherein the correspondence determining step (c) further includes the step of:

(ii) subsequently determining a remaining one (g) of the unknown quantities as a corresponding one to a remaining one of the PDE's which includes a term of a form div (B.grad g) wherein B is a tensor which does not have non-zero diagonal elements and a dot designates a scalar product.

14. A method according to claim 13, wherein the correspondence determining step (c) further includes the step of:
(iii) further subsequently determining one of further remaining unknown quantities as a corresponding one to one of further remaining PDE's which does not include a term related to the one further remaining unknown quantity nor a second-order derivative of another one of the further remaining unknown quantities but includes a first order derivative of the another further remaining unknown quantity.

15. A method according to claim 14, wherein the correspondence determining step (c) further includes the step of:
(iv) still subsequently determining still remaining unknown quantities as corresponding ones to still remaining PDE's according to a predetermined order of the still remaining unknown quantities.

16. A method according to claim 7, wherein the introducing step (b1-3) includes the step of:
(i) replacing a result of the partial integration obtained by the step (b1-2) for one of the PDE'S, by one boundary condition of a first kind among the group of boundary conditions, which one boundary condition includes a condition on a value of one unknown quantity and not a condition on a normal derivative of the one unknown quantity at part of the boundary of the calculation object region.

17. A method according to claim 16, further comprising the step
(d) determining correspondence among PDE's for which the replacing step (i) is to be effected and boundary conditions of the first kind included in the group of boundary conditions, so that different boundary conditions of the first kind correspond to different PDE'S; wherein the replacing step (i) is executed for a respective pair of a boundary condition of the first kind and a corresponding PDE.

18. A method according to claim 17, wherein the correspondence determining step (d) is effected depending upon a kind of an unknown quantity included in a respective one of the boundary conditions of the first kind.

19. A method according to claim 17, wherein the correspondence determining step (d) includes the step of:
(i) determining a first boundary condition of the first kind as being a boundary condition of the first kind corresponding to a first one of the PDE'S, when a weight-function order predetermined for a first unknown quantity included in the first boundary condition is same as a weight-function order determined for the first PDE.

20. A method according to claim 19, wherein the correspondence determining step (d) further includes the step of:
(ii) determining, in absence of a pair of the first boundary condition and the first PDE, a second boundary condition of the first kind as being a boundary condition of the first kind corresponding to a second PDE, when a second unknown quantity included in the second boundary condition appears in the second PDE in a form of a second-order derivative.

21. A method according to claim 19, wherein the correspondence determining step (d) further includes the step of: cancelling determination about correspondence of the first boundary condition and the first PDE, when the first unknown quantity appears in the first PDE only in a form of a first-order derivative.

22. A method according to claim 17, wherein the introducing step (b1-3) further includes the step of:
(ii) replacing an integral term of one of the unknown quantities, included in a boundary integration along a part of the boundary of the calculation object region, included in a result of the partial integration on one of the PDE'S, by an expression determined by a boundary condition of a second kind included in the group of boundary conditions, which includes a normal gradient of the one unknown quantity at the part of the boundary of the calculation object region.

23. A method according to claim 22, wherein the replacing step (i) included in the introducing step (b1-3) is effected after the replacing step (ii) included therein; and
wherein the correspondence determining step (d) is effected for remaining ones of the PDE's for which ones replacement by the replacing step (ii) is not executed.

24. A method according to claim 7, wherein the generating step (b1-4) includes the steps of:
(i) replacing a respective one of unknown quantities included in a respective result obtained either by the step (b1-2) or the step (b1-4), by a corresponding sum ($\Sigma_k N_k f_k$) of products of unknown values ($f_k$'s) of the one unknown quantity and values of weight functions ($N_k$'s) related thereto both at different nodes included in the calculation object region.

25. A method according to claim 7, wherein the generating step (b1-4) includes the step of:
generating the first mathematical expression so that non-diagonal matrix coefficients become zero, in response to a request of diagonalization, included in the input information.

26. A program generation method for automatically generating, by use of a computer, a simulation program used in simulating a physical phenomenon and is written in a program language which cannot describe a differential operator from an input program which describes the physical phenomenon and is written in a program language which can describe a differential operator comprising the steps, executed by said computer of:
(a) inputting to said computer input information in the form of said input program written in a program language which can describe a differential operator having simultaneous partial differential equations (PDE's) which govern plural unknown quantities and a group of boundary conditions each to be satisfied at least by one of the plural unknown quantities on the boundary; and
(b) performing operations in said computer on said input information according to the finite element method to generate said simulation program including the steps of:
(b1) generating, based upon the PDE's and the group of boundary conditions, a first mathematical expression for an arbitrary matrix coefficient ($a_{ij}$) of a matrix equation ($a_{ij}$)($f_j$)=($c_j$) and a second mathematical expression for an arbitrary constant term ($c_j$) of the matrix, wherein first suffixes (i, j) of the matrix coefficients ($a_{ij}$) denote different combinations of the PDE's and nodes located on element regions included in a calculation object region and second suffixes (j) of the matrix equation denote different combinations of the nodes and the unknown quantities, and wherein a set of solutions ($f_j$'s) related to one unknown quantity of the matrix equation enables a value of the one unknown quantity at an arbitrary point within the calculation object region to be calculated by a sum of products each of a respective solution ($f_j$) related to the one unknown quantity and a weight function ($N_j$) related to the one unknown quantity, and (b2) generating said simulation program written in program language which can not describe a differential operation for calculating values of the matrix coefficients ($a_{ij}$'s) and the constant terms ($c_j$) in response to the generated first and second mathematical expression, said generated program being used for simulating a physical phenomenon;

wherein the step (b1) includes the steps of:

(b1-1) performing a partial integration on each of PDE's multiplied by respective weight functions of respective orders predetermined for respective PDE'S, wherein the partial integration is executed over an element region of the calculation object region, (b1-2) introducing the group of boundary conditions into results of the partial integration on part of the PDE's, wherein introducing of one of the group of boundary conditions into one result of the partial integration on one of the PDE's includes either replacing the one result by the boundary condition, or replacing a term included in the one result by an equivalent term determined by the one boundary condition, and (b1-3) generating the first and second mathematical expressions in response both to the results of the partial integration obtained by the partial integration performing step (b1-1) and to results obtained by the introducing step (b1-2).

27. A program generation method for automatically generating, by use of a computer, a simulation program used in simulating a physical phenomenon and is written in a program lanaguage which cannot describe a differential operator from an input program which describes the physical phenomenon and is written in a program language which can describe a differential operator comprising the steps executed by said computer of:

(a) inputting to said computer input information in the form of said input program written in a program language which can describe a differential operator having at least one partial differential equation which govern plural unknown quantities and a group of boundary conditions each to be satisfied by at least one of the unknown quantities on the boundary; and (b) performing operations in said computer on said input information according to the finite element method to generate said simulation program including the steps of:

(b1) generating, based upon the partial differential equation, and the boundary condition, a first mathematical expression representing an arbitrary matrix coefficient ($a_{ij}$) for a matrix equation ($a_{ij}$)($f_j$)=($c_j$) and a second mathematical expression representing an arbitrary constant term ($c_j$) of the matrix equation, wherein first suffixes (i) and second suffixes (j) of the matrix coefficients ($a_{ij}$) denote different nodes located on element regions included in a calculation object region, and wherein a set of solutions ($f_j$'s) related to one unknown quantity of the matrix equation enables a value of the one unknown quantity at an arbitrary point within the calculation object region to be calculated by a sum of products of a respective solution ($f_j$) and a weight function ($N_j$), and (b2) generating said simulation program written in a program language which can not describe a differential operation for calculating values of the matrix coefficients ($a_{ij}$'s) and the constant terms ($c_j$) in response to the generated first and second mathematical expressions, said generated simulation program being used for simulating said physical phenomenon;

wherein the step (b1) includes the steps of:

(b1-1) performing a partial integration on the partial differential equation multiplied by a weight function of a selected order, wherein the partial integration is executed over an element region of the calculation object region, (b1-2) introducing the boundary condition into a result of the partial integration, and (b1-3) generating the first and second mathematical expressions in response to a result of the step (b1-1) and a result of the step (b1-2), in such a manner that non-diagonal matrix coefficients become zero and the first mathematical expression relates only to diagonal matrix coefficients ($a_{ij}$'s), including the steps of:

(i) substituting the unknown quantity included in a result of either the step (a1) or the step (a2), by a linear sum ($\Sigma f_i$) of values ($f_i$) which the unknown quantity takes at various nodes, and (ii) evaluating different terms included in a result of the substituting step, so as to provide the first mathematical expression for diagonal matrix coefficients and the second mathematical expression for the constant terms ($c_j$);

wherein the simulation program generated in the step (b2) is a program for calculating values of diagonal matrix coefficients ($a_{ij}$'s) and the constant terms ($c_j$).

28. A program generation method for automatically generating, by use of a computer, a simulation program used in simulating of a physical phenomenon and is written in a program language which cannot describe a differential operator from an input program which describes the physical phenomenon and is written in a language which can describe a differential operator, comprising the steps, executed by said computer of:

(a) inputting to said computer input information in the form of said input program written in a program language which can describe a differential operator having simultaneous partial differential equations (PDE's) which govern plural unknown quantities and a group of boundary conditions each to be satisfied on the boundary at least by one of the plural unknown quantities; and (b) performing operations in said computer on said input information according to the finite element method to generate said simulation program including the steps of:

(b1) generating, based upon the PDE's and the group of boundary conditions, a first mathematical expression for an arbitrary matrix coefficient ($a_{ij}$) of a matrix equation ($a_{ij}$)($f_j$)=($c_j$) and a second mathematical expression for an arbitrary constant term ($c_j$) of the matrix equation, wherein first suffixes (i, j) of the matrix coefficients ($a_{ij}$) denote different combinations of the PDE's and nodes located on element regions included in a calculation object region and second suffixes (j) of the matrix equation denote different combinations of the nodes and the unknown quantities, and wherein a set of solutions ($f_j$'s) related to one unknown quantity of the matrix equation enables a value of the one unknown quantity at an arbitrary point within the calculation object region to be calculated by a sum of products each of a respective solution ($f_j$) related to the one unknown quantity and a weight function ($N_j$) related to the one unknown quantity, and (b2) generating said simulation program written in a program language which can not describe a differential operation for calculating values of the matrix coefficients ($a_{ij}$'s) and the constant terms ($c_j$) in response to the generated first and second mathematical expressions, said generated simulation program being used for simulating said physical phenomenon;

wherein said step (b1) includes the steps of:

(b1-0) transforming each of the inputted PDEs and boundary conditions into a binary tree which includes plural nodes by said computer, (b1-1) determining an order of a weight function to be used in subsequent partial integration of a respective PDE, (b1-2) performing a partial integration on each of said partial differential equations multiplied by respective weight functions of respective orders determined by the step (b1-1) for respective partial differential equations, by either inserting or replacing respective nodes in the binary tree obtained from the step (b1-0), (b1-3) introducing the group of boundary conditions into results of the partial integration on part of the PDEs, by inserting and replacing respective nodes in the binary tree obtained for the step (b1-2), wherein introducing of one of the group of boundary conditions into one result of the partial integration on one of the PDEs includes either replacing the one result by the one boundary condition, or replacing a terminal included in the one result by an equivalent term determined by the one boundary condition, (b1-4) searching each of the binary trees resulting form the step (b1-2) for the nodes corresponding to the variables to be solved, finding a part of the binary tree which is a coefficient of each of said variables, and outputting a piece of program which consists of a loop structure, such as DO loop of FORTRAN, in which numerical integration of the coefficient and assignment of the coefficient to the global coefficient matrix are performed, and (b1-5) searching each of the binary trees resulting form the step (b1-2) for parts of the tree corresponding to the arbitrary constants, and outputting a piece of program which consists of a loop structure, such as DO loop of FORTRAN, in which numerical integration of the coefficient and assignment of the coefficient to the global arbitrary constant vector are performed.

29. A program generation method for automatically generating, by use of a computer, a simulation program used in simulating of a physical phenomenon and is written in a program language which cannot describe a differential operator from an input program which describes the physical phenomenon and is written in a program language which can describe a differential operator, comprising the steps, executed by said computer of:

(a) inputting to said computer input information in the form of said input program written in a program language which can describe a differential operator having simultaneous partial differential equations (PDE's) which govern plural unknown quantities and a group of boundary conditions each to be satisfied on the boundary at least by one of the plural unknown quantities; and (b) performing operations in said computer on said input information according to the finite element method to generate said simulation program including the steps of:

(b1) generating, based upon the PDE's and the group of boundary conditions, a first mathematical expression for an arbitrary matrix coefficient ($a_{ij}$) of a matrix equation ($a_{ij}$)($f_j$)=($c_j$) and a second mathematical expression for an arbitrary constant term ($c_j$) of the matrix equation, wherein first suffixes (i, j) of the matrix coefficients ($a_{ij}$) denote different combinations of the PDE's and nodes located on element regions included in a calculation object region and second suffixes (j) of the matrix equation denote different combinations of the nodes and the unknown quantities, and wherein a set of solutions ($f_j$'s) related to one unknown quantity of the matrix equation enables a value of the one unknown quantity at an arbitrary point within the calculation object region to be calculated by a sum of products each of a respective solution ($f_j$) related to the one unknown quantity and a weight function ($N_j$) related to the one unknown quantity, and (b2) generating said simulation program written in a program language which can not describe a differential operation for calculating values of the matrix coefficients ($a_{ij}$'s) and the constant terms ($c_j$) in response to the generated first and second mathematical expressions, said generated simulation program being used for simulating said physical phenomenon;

wherein said step (b1) includes the steps of:

(b1-0) transforming each of the inputted PDEs into binary tree with a header by said computer, said binary tree includes plural nodes in which intermediate nodes store operators, terminal nodes store variable names and an interpolation order, and the header stores the object variable of the PDE, (b1-0') transforming each of the inputted boundary conditions into a binary tree with a header by said computers said binary tree includes plural nodes in which intermediate nodes store operators, terminal nodes store variable names and the header stores the name of the region where the boundary condition is specified and the kind of the boundary condition, (b1-1) determining an order of a weight function to be used in subsequent partial integration of respective PDE and creating an integration form by the step of:

(b1-1a) inserting a partial tree into each o the binary trees obtained in the step (b1-0), wherein each partial tree consists of a region integral node, a multiplication node and a weight function node;

(b1-2) performing a partial integration on each of the PDEs' integration form determined by the step (b1-1) by the steps of:

(b1-2a) inserting nodes into the binary tree obtained in the step (b1-0), wherein the nodes to be inserted consist of an integration node, a multiplication node and a weighing function node, (b1-2b) removing a divergent node from the binary tree and inserting a gradient node (b1-2c) creating a binary tree corresponding to the boundary integration term which consists of a boundary integration node, a multiplication node, and a normal gradient node;

(b1-3) introducing the group of boundary conditions into results of the partial integration on part of the PDEs, by the steps of:

(b1-3a) finding a first binary tree among the binary trees obtained by the step (b1-2c) and a second binary tree among the binary trees obtained by the step (b1-0'), each of the first and second binary trees having an identical partial binary tree headed by a node corresponding to an operator on an operation which involves a normal vector of a boundary of the calculation object region, and replacing the identical partial tree included in the first binary tree by a partial binary tree which is included in the second binary tree and is located on a side of an equal operator included in the second binary tree, opposite to a side of the equal operator in which the identical normal operator within the second binary tree is located, and (b1-3b) finding a third binary tree among the binary trees obtained by the step (b1-2c) and a fourth binary tree among the binary trees obtained by the step (b1-0'), each of the third and fourth binary trees having a header which stores an identical object variable, and replacing the third binary tree by the fourth binary tree;

(b1-4) replacing terminal nodes holding the names of the variables in each of the binary trees with partial binary trees which consist of a summation node, a variable node and an interpolation function node whose order is identical to the interpolation order stored in the terminal node, (b1-5) searching each of the binary trees resulting from the step (b1-4) for the nodes corresponding to the object variables, finding a partial binary tree which is a coefficient of each of said variables, and outputting a piece of program which consists of a loop structure, such as DO loop of FORTRAN, in such a manner that numerical integration of the coefficient with respect to the order of the weight function and the interpolation function in the partial binary tree is calculated and assignment of the coefficient to the global coefficient matrix is performed, and (b1-6) searching each of the binary trees resulting from the step (b1-4) for partial binary tree corresponding to the arbitrary constants, and outputting a piece of program which consists of a loop structure, such as DO loop of FORTRAN, in such a manner that numerical integration of the coefficient with respect to the order of the weight function and the interpolation function in the partial binary tree is calculated and assignment of the coefficient to the global arbitrary constant vector is performed.

* * * * *